(12) United States Patent
Suzuki

(10) Patent No.: US 8,056,097 B2
(45) Date of Patent: Nov. 8, 2011

(54) DISK RECORDING AND/OR REPRODUCING APPARATUS

(75) Inventor: Yoshiaki Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 431 days.

(21) Appl. No.: 12/396,768

(22) Filed: Mar. 3, 2009

(65) Prior Publication Data

US 2009/0228907 A1    Sep. 10, 2009

(30) Foreign Application Priority Data

Mar. 4, 2008   (JP) ................... P2008-054119

(51) Int. Cl.
*G11B 25/04*    (2006.01)

(52) U.S. Cl. ..... 720/710; 720/604; 720/706; 369/75.21; 360/99.12

(58) Field of Classification Search .............. 720/710, 720/604, 706, 713, 714
See application file for complete search history.

(56) References Cited

U.S. PATENT DOCUMENTS

| | | | | |
|---|---|---|---|---|
| 6,160,780 A | * | 12/2000 | Furukawa et al. | 720/604 |
| 6,316,854 B1 | * | 11/2001 | Liang et al. | 310/67 R |
| 6,438,087 B2 | * | 8/2002 | Omori | 720/604 |
| 7,047,543 B2 | * | 5/2006 | Lin et al. | 720/710 |
| 7,194,745 B2 | * | 3/2007 | Ogasawara | 720/604 |
| 7,454,765 B2 | * | 11/2008 | Kim et al. | 720/604 |

FOREIGN PATENT DOCUMENTS

| | | |
|---|---|---|
| JP | 64 60847 | 3/1989 |
| JP | 11 96635 | 4/1999 |

* cited by examiner

*Primary Examiner* — Tan T. Nguyen

(74) *Attorney, Agent, or Firm* — Frommer Lawrence & Haug LLP; William S. Frommer; Thomas F. Presson

(57) ABSTRACT

There is provided a disk recording and/or reproducing apparatus including: a disk mounting part; a clamp member holding a disk-shaped recording medium between the clamp member and the disk mounting part; and a support member movably supporting the clamp member. One of the disk mounting part and the clamp member has a magnet and the other has an attractable member attracted to the magnet. A rotating member is rotatably supported by the support member and a rotary elevating mechanism moves the rotating member up and down at a predetermined height by rotating the member. The clamp member is allowed to approach the disk mounting part by attracting the attractable member by a magnetic force of the magnet or to depart from the disk mounting part against a magnetic force of the magnet.

5 Claims, 29 Drawing Sheets

US 8,056,097 B2

DISK RECORDING AND/OR REPRODUCING APPARATUS

CROSS REFERENCES TO RELATED APPLICATIONS

The present invention contains subject matter related to Japanese Patent Application JP 2008-054119 filed in the Japanese Patent Office on Mar. 4, 2007, the entire contents of which being incorporated herein by reference.

BACKGROUND OF THE INVENTION

1. Field of the Invention

The present invention relates to a disk recording and/or reproducing apparatus in which an information signal is recorded (written) on and/or reproduced (read) from a disk-shaped recording medium such as an optical disk or a magneto-optical disk. In particular, the present invention relates to a disk recording and/or reproducing apparatus including a clamp member fixing a disk-shaped recording medium to a disk mounting part.

2. Description of the Related Art

Generally, disk recording and/or reproducing apparatuses in which an information signal is recorded on and/or reproduced from a disk-shaped recording medium such as an optical disk (OD) such as a CD or DVD, or a magneto-optical disk (MO) have been provided as apparatuses for storing a large amount of information.

Japanese Unexamined Patent Application Publication No. 2002-334499 discloses an example of such a disk recording and/or reproducing apparatus of the related art. Japanese Unexamined Patent Application Publication No. 2002-334499 discloses a slot-in disk recording and/or reproducing apparatus having a disk entrance through which a disk-shaped recording medium enters and exits. The disk recording and/or reproducing apparatus according to Japanese Unexamined Patent Application Publication No. 2002-334499 (hereinafter referred to as "first related art example") is as follows. Specifically, the apparatus includes an enclosure having a disk entrance; a gate member provided to cover the disk entrance; and a disk moving mechanism moving a disk-shaped recording medium to pass through the disk entrance. The gate member has a gate cover having a cut edge through which a disk-shaped recording medium passes; and a resistance modifying device modifying resistance on a periphery of the cut edge. The gate member is formed of a fabric member such as a fabric, a synthetic resin sheet, etc., and is constructed such that the gate cover rotates around a slit when a disk-shaped recording medium is inserted into the disk entrance.

Japanese Unexamined Patent Application Publication No. 2006-302425 discloses another example of a disk recording and/or reproducing apparatus of the related art. Japanese Unexamined Patent Application Publication No. 2006-302425 discloses a disk clamp mechanism which may be used for both a read-only (non-recordable) disk and a read/write (recordable) disk, and a disk drive device including the same. The disk drive device according to Japanese Unexamined Patent Application Publication No. 2006-302425 (hereinafter referred to as "second related art example") is as follows. Specifically, the device includes a clamp arm rotated around a fulcrum and between a clamp position and a clamp release position. The device also includes a damper which is maintained with a clearance at the top of the clamp arm and is rotated to the clamp position to press a disk against a turntable, and is rotated to the clamp release position to release pressing of the disk against the turntable. A top bent part bent toward the turntable is formed at the top of the clamp arm, where a bending point of the top bent part bent relative to the clamp arm is deviated from the center of gravity of the damper toward the fulcrum by a predetermined dimension.

However, in the aforementioned first and second related art examples, a lever rotatably supports a clamp member, and the lever is vertically rotated to change an inclination angle, so that the clamp member is pressed against a disk mounted on a disk mounting part. In this type, since the lever is moved in a wide range, a large space is needed to ensure its movement and the whole apparatus is increased in size, disadvantageously. Moreover, a pressing force of the clamp member against the disk mounting part is generally based on an attraction force generated between a magnet and an iron piece incorporated in these members. Therefore, the lever may need a strength enough to withstand a force to strip the clamp member from the disk mounting part against a pressing force of the magnet when the disk is ejected. As a result, the lever may need to be prepared, with a sufficient strength ensured, using a material having a certain strength, and is therefore limited in terms of the usable material and size, disadvantageously.

In another related art example, a lever rotatably supporting a clamp member is moved along a circumference of a disk, so that the clamp member is pressed against the disk mounted on a disk mounting part. However, in this type, a holding member holding the clamp member has an inclined surface, and the clamp member is pressed upward from both sides to release a pressing force of the clamp member. Therefore, a space for moving the holding member is needed, and furthermore a space to connect the members to each other is widened, making the structure complicated, disadvantageously. Moreover, since the clamp member is supported only by both edges of the holding member, an attitude of the clamp member is unstable, disadvantageously. In this regard, although the clamp member may be supported by many points of the holding member, the number of components is increased in order to support the clamp member by many points, making the structure complicated, disadvantageously.

SUMMARY OF THE INVENTION

In a disk recording and/or reproducing apparatus of the related art, a lever rotatably supporting a clamp member has a large size, and furthermore the lever is constructed so as to be changed in attitude and to be moved. Therefore, a large space is needed to ensure movement of the lever, making it difficult to reduce the whole apparatus in size. Moreover, the clamp member having an iron piece is supported by a support member so as to be movable within a predetermined range, and the clamp member is allowed to face a disk mounting part having a magnet. Therefore, when the clamp member is allowed to approach the disk mounting part, the clamp member starts to be rapidly attracted to the disk mounting part in a certain place and collides with a disk-shaped recording medium mounted on the disk mounting part. As a result, a loud collision sound is generated when the clamp member collides with the disk-shaped recording medium. Also, a large force is needed to strip the clamp member from the disk mounting part, disadvantageously.

According to an embodiment of the present invention, there is provided a disk recording and/or reproducing apparatus including: a disk mounting part on which a disk-shaped recording medium is detachably mounted; a clamp member holding the disk-shaped recording medium mounted on the disk mounting part between the clamp member and the disk mounting part; and a support member movably supporting the clamp member. One of the disk mounting part and the clamp member has a magnet and the other has an attractable member attracted to the magnet. Further, a rotating member is rotatably supported by the support member and a rotary elevating mechanism moves the rotating member up and down at a predetermined height by rotating the rotating member. The rotating member is rotated and moved up and down by the rotary elevating mechanism, so that the clamp member is allowed to approach the disk mounting part by attracting the attractable member by a magnetic force of the magnet or to depart from the disk mounting part against a magnetic force of the magnet.

According to a disk recording and/or reproducing apparatus according to an embodiment of the present invention, a small disk clamp structure to fix a disk-shaped recording medium to a disk mounting part may be formed using only a small number of components, and the whole apparatus may be reduced in size. A clamp member attracted by a magnetic force of a magnet may be stripped from the disk mounting part by a relatively small force by rotating a rotating member. Further, it is possible to reduce an operation sound when the clamp member is brought into contact with or stripped from the disk mounting part, and to suppress noise generation.

BRIEF DESCRIPTION OF THE DRAWINGS

FIG. 12 describes a first example of a change in attitude of a disk drive device of a disk recording/reproducing apparatus according to a disk recording and/or reproducing apparatus according to an embodiment of the present invention, where

FIG. 13 describes a second example of a change in attitude of a disk drive device of a disk recording/reproducing apparatus according to a disk recording and/or reproducing apparatus according to an embodiment of the present invention, where

FIG. 16 describes an operation of a rotary elevating mechanism of a disk recording/reproducing apparatus according to a disk recording and/or reproducing apparatus according to an embodiment of the present invention, where

FIG. 17 shows cross-sections of a turntable and a clamp member of a disk recording/reproducing apparatus according to a disk recording and/or reproducing apparatus according to an embodiment of the present invention, where

DESCRIPTION OF THE PREFERRED EMBODIMENTS

A rotating member rotatably supported by a support member is rotated at a predetermined angle by a rotating part of a rotary elevating mechanism and is moved up and down at a predetermined height by an elevating part of the rotary elevating mechanism. This makes it possible to allow a clamp member to approach or depart from a disk mounting part slowly and to strip the clamp member from the disk mounting part by a small force.

EXAMPLE 1

Figure 1:
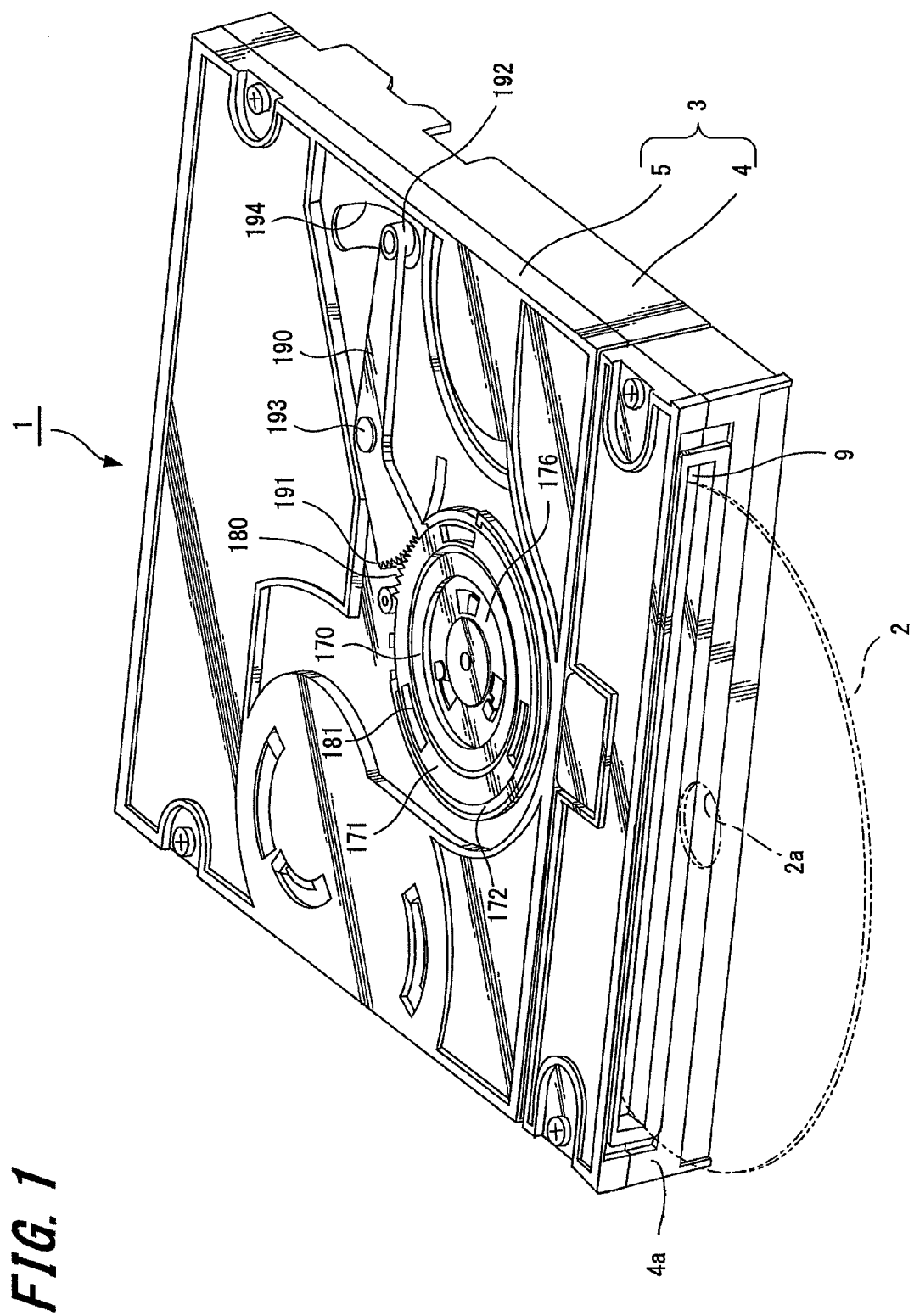
FIG. 1 is an appearance perspective view showing an example of a disk recording/reproducing apparatus according to a disk recording and/or reproducing apparatus according to an embodiment of the present invention.

A disk recording and/or reproducing apparatus according to an embodiment of the present invention will be described below with reference to the attached drawings. FIG. 1 is an appearance perspective view showing an example of a disk recording and/or reproducing apparatus according to an embodiment of the present invention, which is a disk recording/reproducing apparatus by which information may be not only reproduced but also recorded. A disk recording/reproducing apparatus 1 shown in this example is configured so that an information signal may be both recorded (written) on and reproduced (read) from an optical disk 2 having a diameter of 12 cm as a disk-shaped recording medium. However, the disk recording and/or reproducing apparatus 1 may be a disk reproducing apparatus where only reproduction is possible, or may be a disk recording apparatus where only recording is possible.

A read-only optical disk such as a CD or DVD, or a write-once optical disk such as a CD-R, DVD-R or video CD-R may be used as the disk-shaped recording medium. Further, it is possible to use a rewritable optical disk such as a CD-RW, DVD-RW or video CD-RW, obviously, and furthermore a read-only optical disk such as a CD or CD-ROM. Moreover, a magneto-optical disk (MO) or the like may also be used as the disk-shaped recording medium.

As shown in FIG. 1, the disk recording/reproducing apparatus 1 includes a main chassis 4 forming a base member having openings on upper and lower surfaces, and an upper plate 5 as an upper surface member covering the upper surface of the main chassis 4. The main chassis 4 and the upper plate 5 form a rectangular parallelepiped flat enclosure 3. A disk drive device (not shown in the figure) movably supported by the main chassis 4 is housed in the enclosure 3. Further, a disk transfer mechanism and a control unit (not shown in the figure) are housed in the enclosure 3, where the disk transfer mechanism transfers the optical disk 2 between a disk mounting part inside the enclosure 3 and a disk ejection part outside the enclosure 3. The control unit operates the disk drive device, the disk transfer mechanism and other devices and mechanisms.

Figure 8:
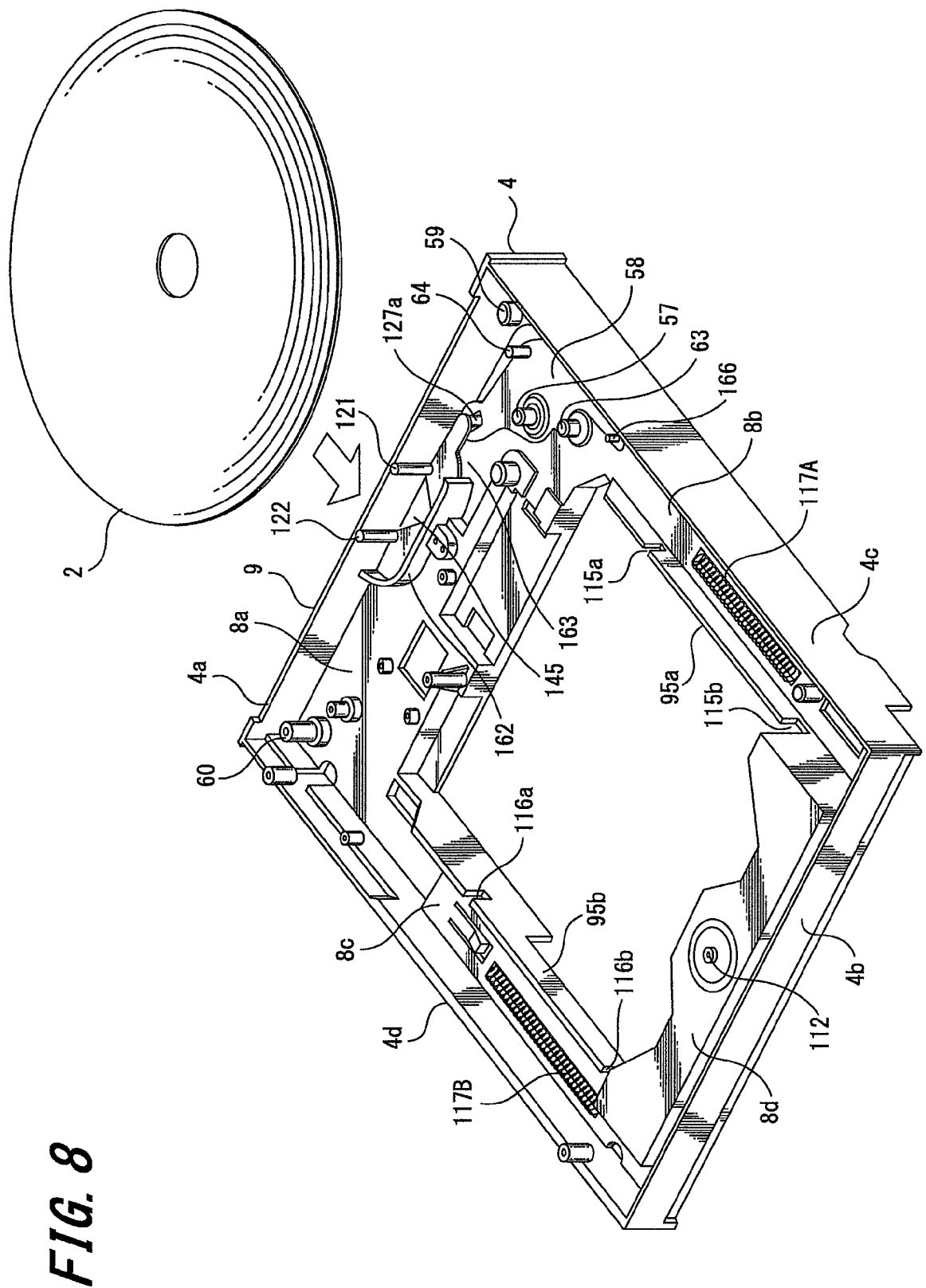
FIG. 8 is a perspective view showing a main chassis of an example of a disk recording/reproducing apparatus according to a disk recording and/or reproducing apparatus according to an embodiment of the present invention.

The main chassis 4 has, as shown in FIG. 8, a front surface 4a, a rear surface 4b and left and right side surfaces 4c and 4d forming a rectangular frame. The direction in which the front surface 4a and the rear surface 4b face each other is a back-and-forth direction in which the optical disk 2 is transferred. A front shelf 8a is provided inside the front surface 4a, extending with a predetermined width in a right-and-left direction crossing the back-and-forth direction. A left sliding part 8b is provided inside the left side surface 4c, extending in the back-and-forth direction with a predetermined width. A right sliding part 8c is provided inside the right side surface 4d, extending in the back-and-forth direction with a predetermined width. A rear shelf 8d is provided inside the rear surface 4b, extending in the right-and-left direction with a predetermined width to connect a rear edge of the left sliding part 8b to a rear edge of the right sliding part 8c.

A disk entrance 9 where the optical disk 2 enters and exits is provided in a contact part of a front surface of the enclosure 3 (the front surface of the main chassis 4 and a front surface of the upper plate 5). The disk entrance 9 is formed as a horizontally long hole extending in the right-and-left direction, and is formed having a transverse length slightly (about 1 to 2 mm) larger than the diameter of the optical disk 2 and a vertical length moderately (about 5 to 8 mm) larger than a thickness of the optical disk 2. It is preferable to attach to the disk entrance 9 a dustproof member that allows passage of the optical disk 2 but is normally closed to block passage of dust or the like. For the dustproof member, a fabric member formed of a nonwoven fabric or a plastic sheet may be used, for example, and a cut to allow passage of the optical disk 2 is provided in a center thereof.

Figure 25:
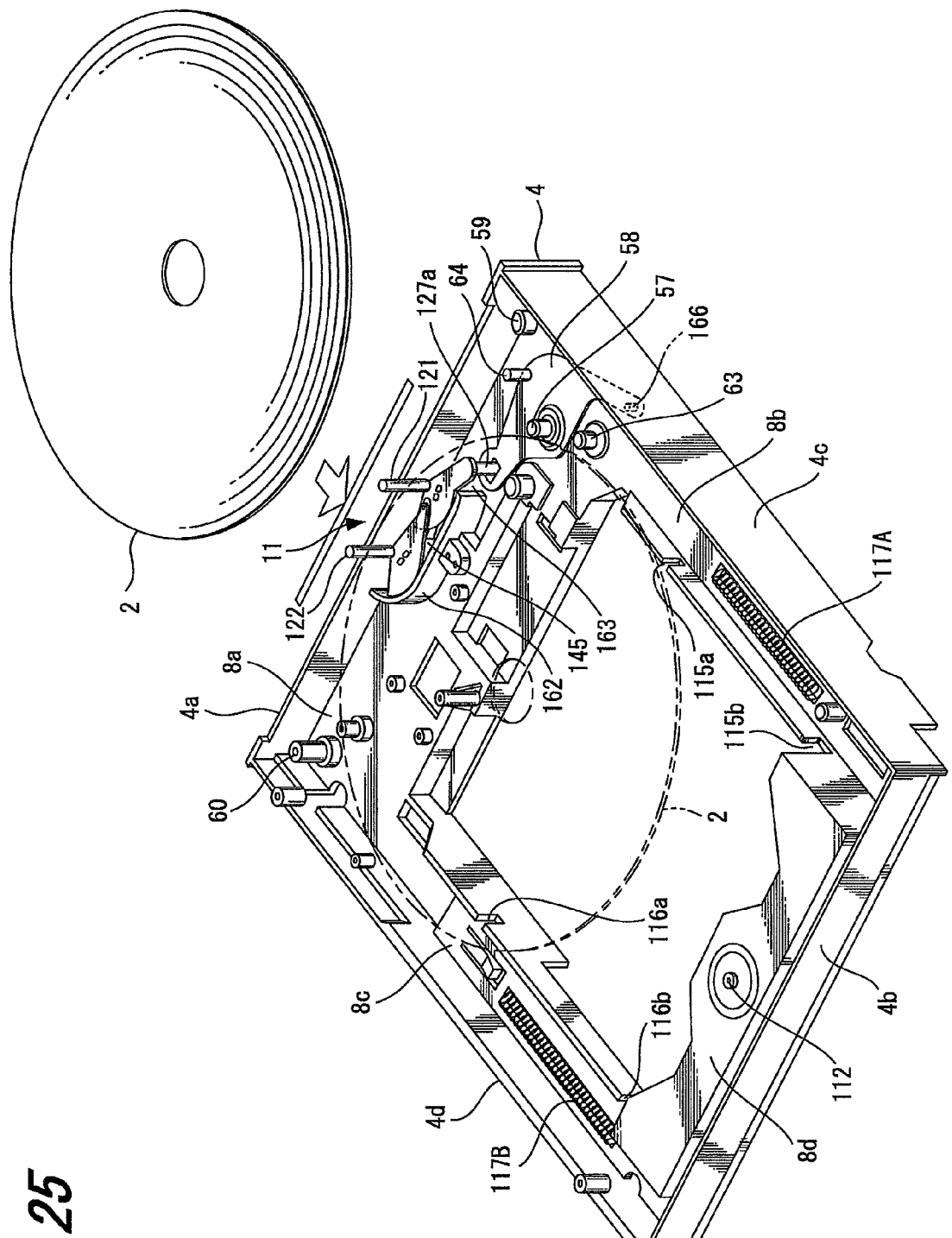
FIG. 25 is a view describing an operation of a stopper advancing/retracting mechanism of a disk recording/reproducing apparatus according to a disk recording and/or reproducing apparatus according to an embodiment of the present invention in a state where insertion of a disk-shaped recording medium is blocked by a stop.

A later-described disk transfer mechanism 10 (FIG. 18) is placed in and attached to an upper part of the front surface 4*a* of the main chassis 4. A predetermined space is provided between the disk transfer mechanism 10 and the front shelf 8*a*. In the space provided are a power section of the disk transfer mechanism 10 described later in detail; and a stopper advancing/retracting mechanism 11 (FIG. 25) having at least one stopper member. The stopper advancing/retracting mechanism 11 moves the stopper member to allow a stopper to protrude toward the disk entrance 9 and block passage of the optical disk 3 and to retract the stopper from the disk entrance 9 and allow passage of the optical disk 3.

Figure 18:
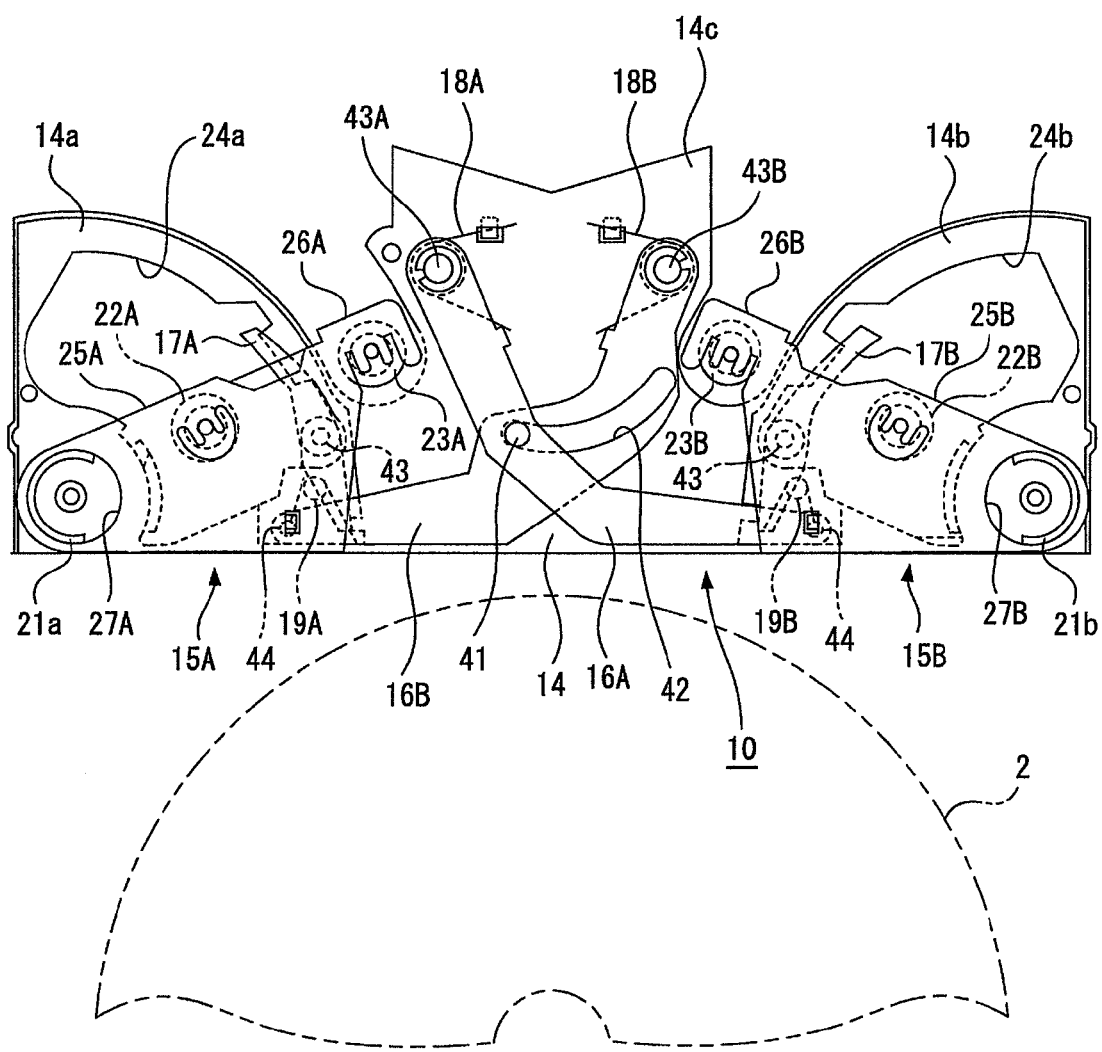
FIG. 18 is a view describing an operation of a disk transfer mechanism of a disk recording/reproducing apparatus according to a disk recording and/or reproducing apparatus according to an embodiment of the present invention before insertion of a disk-shaped recording medium.
Figure 19:
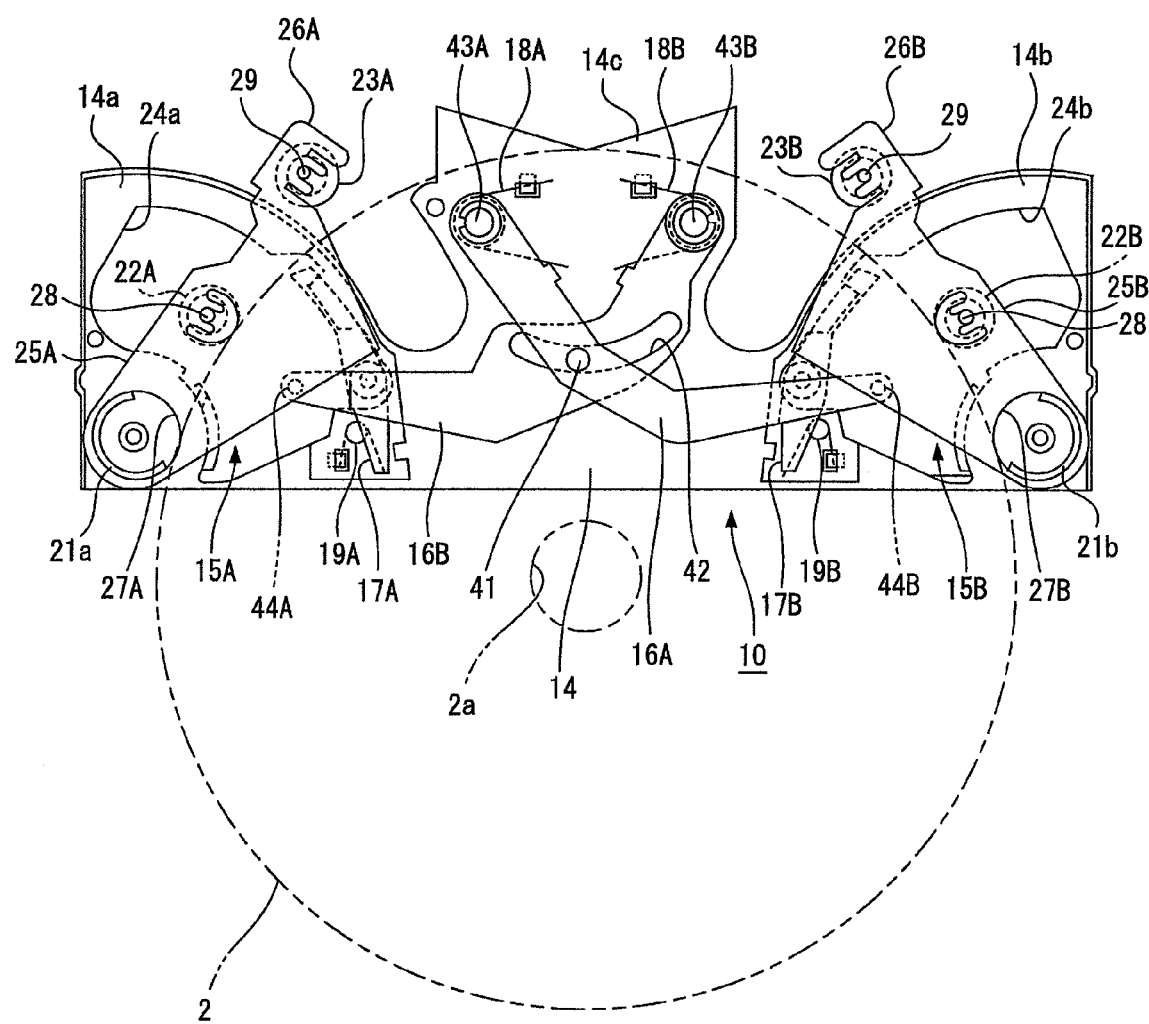
FIG. 19 is a view describing an operation of a disk transfer mechanism of a disk recording/reproducing apparatus according to a disk recording and/or reproducing apparatus according to an embodiment of the present invention during insertion of a disk-shaped recording medium.
Figure 20:
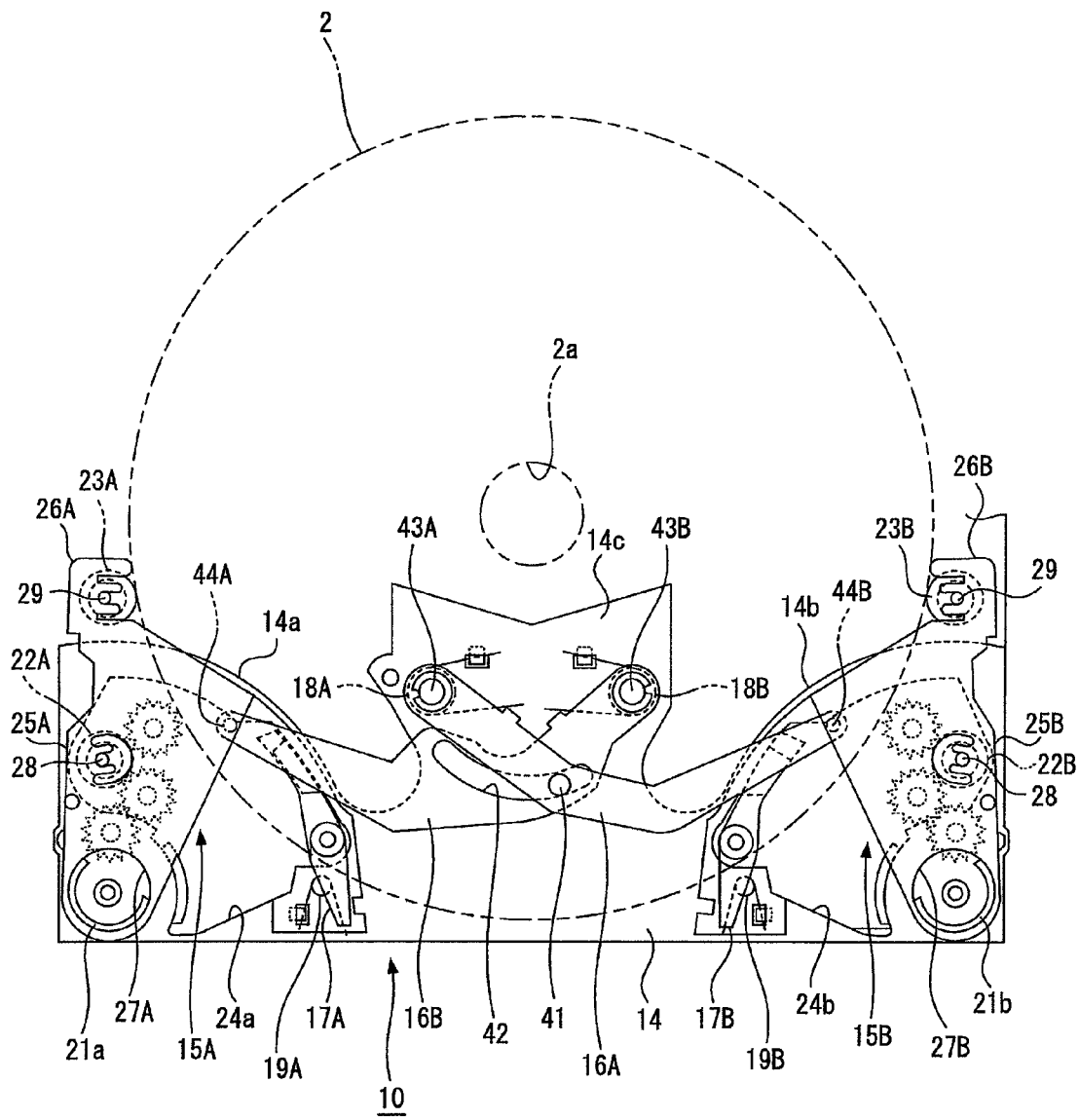
FIG. 20 is a view describing an operation of a disk transfer mechanism of a disk recording/reproducing apparatus according to a disk recording and/or reproducing apparatus according to an embodiment of the present invention after insertion of a disk-shaped recording medium.

The disk transfer mechanism 10 has a configuration as shown in FIGS. 18 to 20. Specifically, the disk transfer mechanism 10 has a base plate 14, a pair of holder arms 15A and 15B, a pair of operating levers 16A and 16B, a pair of rotating levers 17A and 17B, first torsion springs 18A and 18B, and second torsion springs 19A and 19B. The base plate 14 is formed as a flat plate. The pair of holder arms 15A and 15B, the pair of operating levers 16A and 16B and the pair of rotating levers 17A and 17B are rotatably supported by the base plate 14. The first torsion springs 18A and 18B and the second torsion springs 19A and 19B show a specific example of an energizing member energizing the two pairs of lever members 16A and 16B and 17A and 17B along a plane of the base plate 14.

The base plate 14 of the disk transfer mechanism 10 has a length in the right-and-left direction perpendicular to the back-and-forth direction of the main chassis 4 (the direction in which the optical disk 2 is transferred) set to be equal to that of the main chassis 4, and has an appropriate width in the back-and-forth direction. Fan-shaped parts 14*a* and 14*b* are provided on both sides in a longitudinal direction, which is the right-and-left direction of the base plate 14. Bearings 21*a* and 21*b* to rotatably support the pair of holder arms 15A and 15B, respectively, are provided on both corners as centers of fan shapes of the fan-shaped parts 14*a* and 14*b*, respectively. Each of the bearings 21*a* and 21*b* is formed as a semi-cylindrical cylinder shaft with its inner half notched, and a drive gear is rotatably inserted into the bearing.

Figure 21:
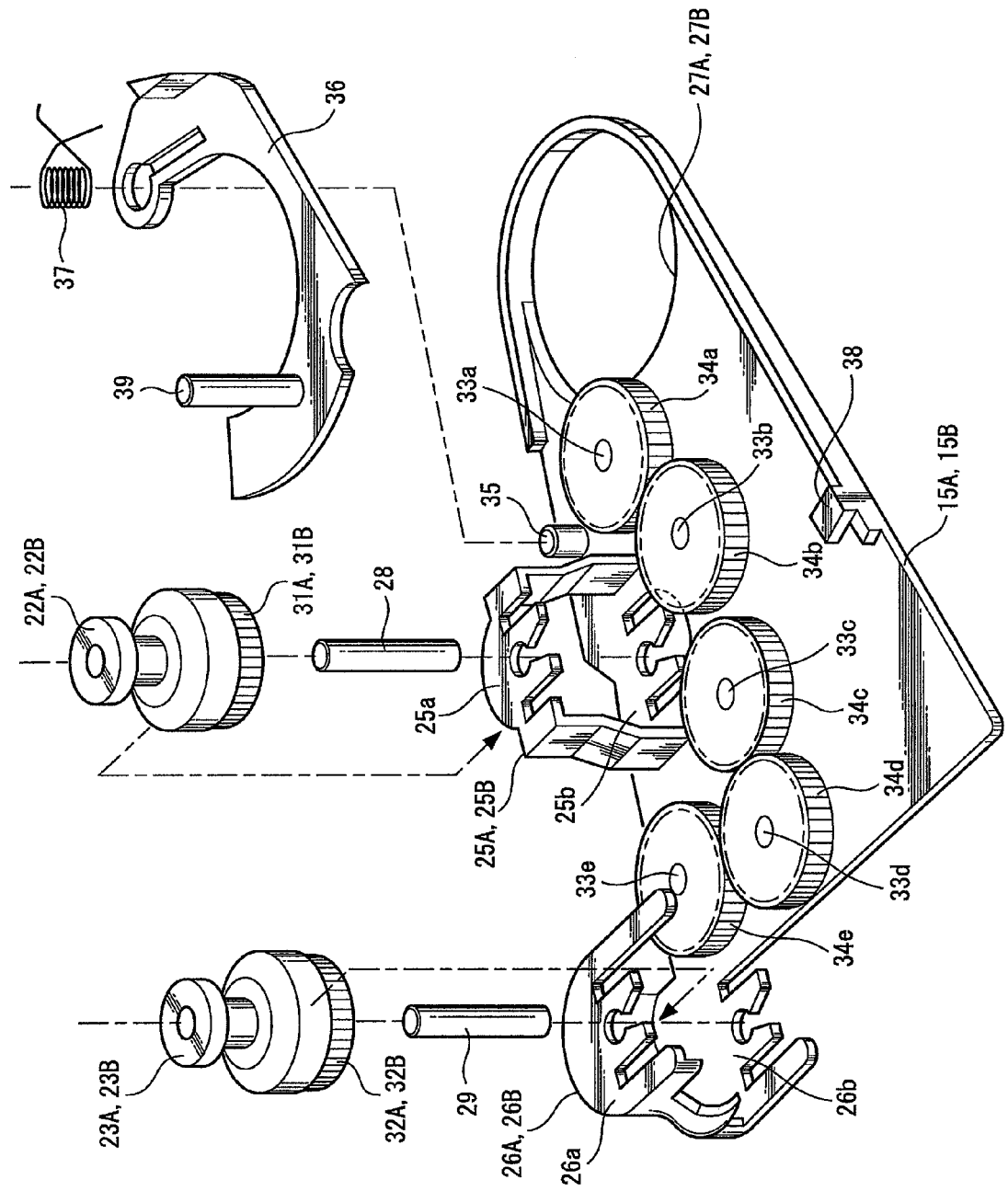
FIG. 21 is an exploded view describing holder arms and other components of a disk transfer mechanism of a disk recording/reproducing apparatus according to a disk recording and/or reproducing apparatus according to an embodiment of the present invention.
Figure 22:
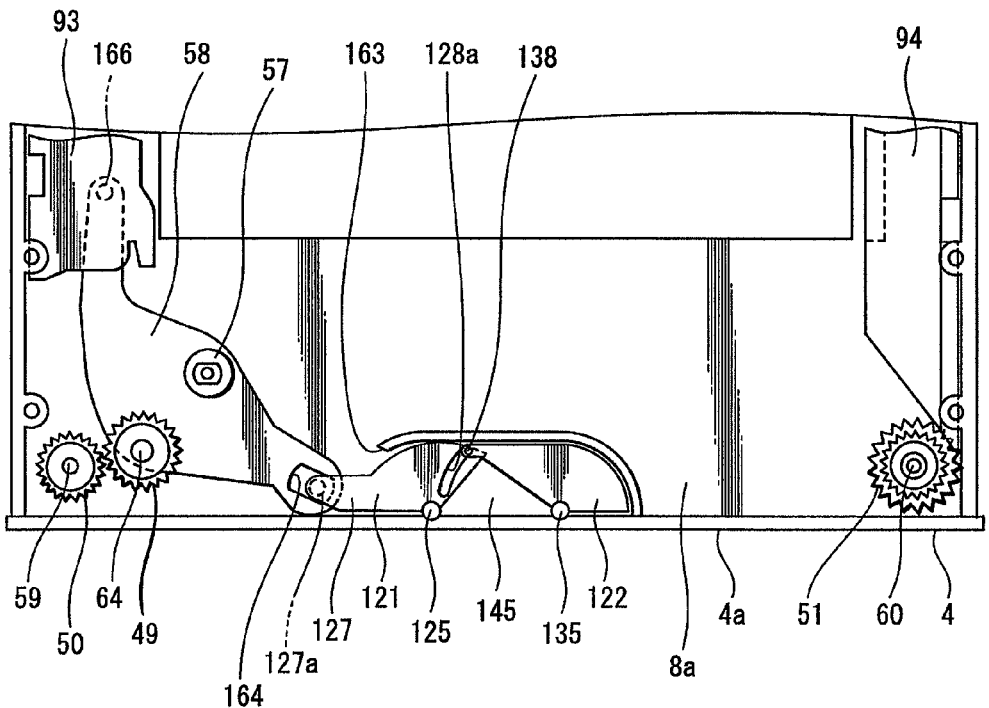
FIG. 22 is a view describing an operation of a stopper advancing/retracting mechanism of a disk recording/reproducing apparatus according to a disk recording and/or reproducing apparatus according to an embodiment of the present invention before protrusion of a stop.
Figure 23:
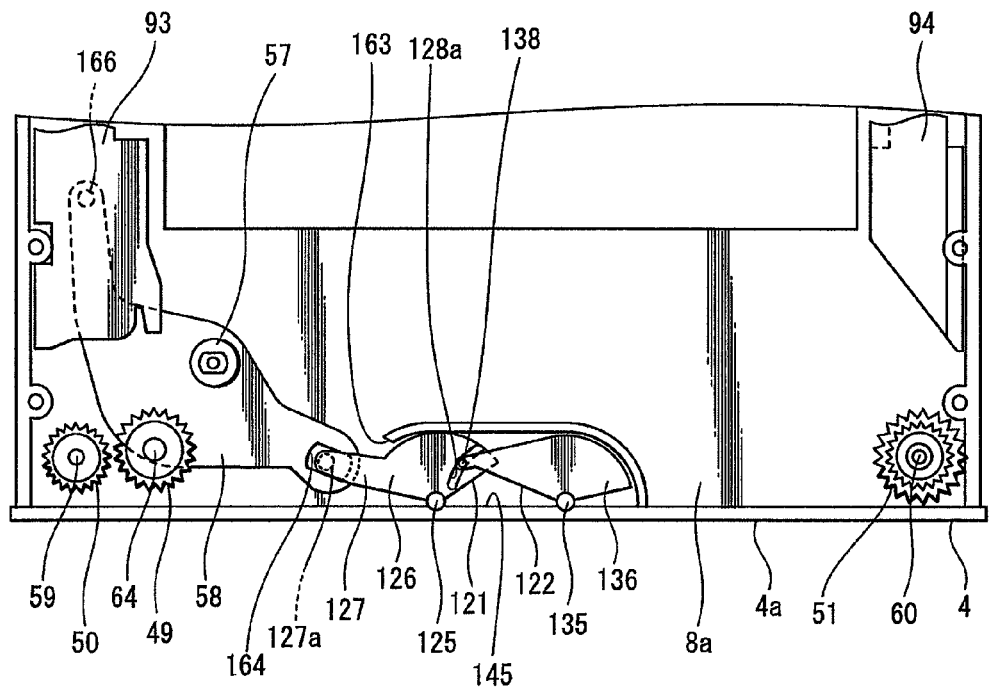
FIG. 23 is a view describing an operation of a stopper advancing/retracting mechanism of a disk recording/reproducing apparatus according to a disk recording and/or reproducing apparatus according to an embodiment of the present invention during protrusion of a stop.
Figure 24:
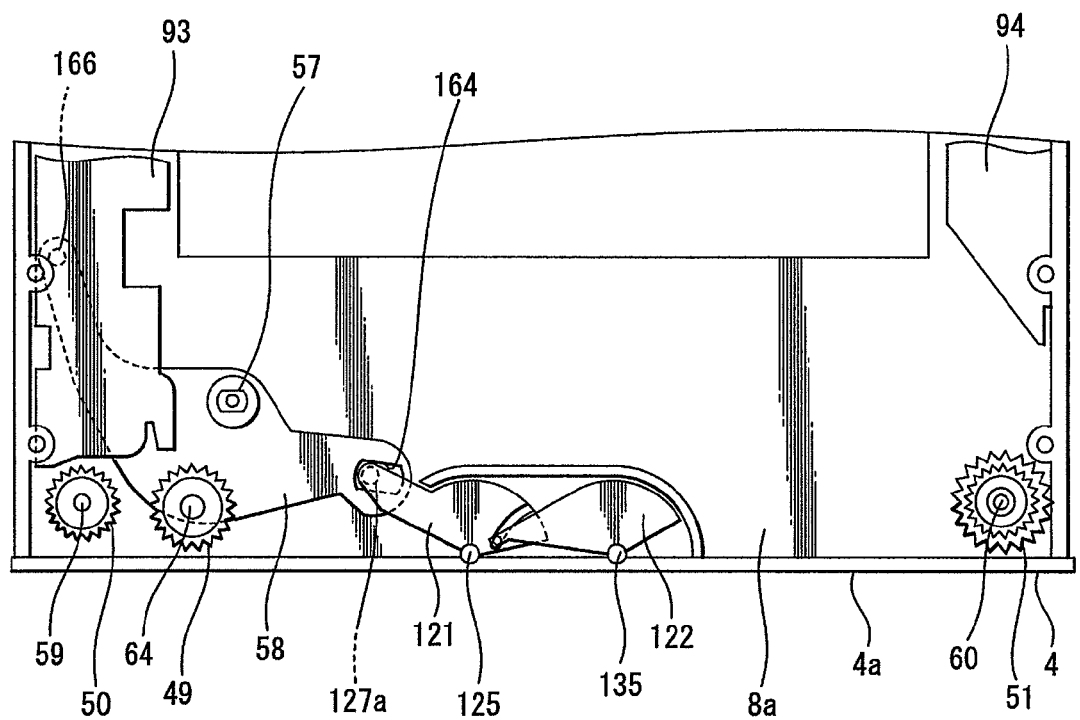
FIG. 24 is a view describing an operation of a stopper advancing/retracting mechanism of a disk recording/reproducing apparatus according to a disk recording and/or reproducing apparatus according to an embodiment of the present invention after protrusion of a stop.

Approximately fan-shaped openings 24*a* and 24*b* penetrating front and back surfaces are provided in the fan-shaped parts 14*a* and 14*b* of the base plate 14. First pulley bearings 25 (see FIG. 21) of the pair of holder arms 15A and 15B rotatably supporting first pulleys 22A and 22B, respectively, penetrate the openings 24*a* and 24*b*, respectively. The pair of holder arms 15A and 15B are bilaterally symmetrical in shape and configuration. The first holder arm 15A on the left is shown in FIG. 21 as their representative example.

The first holder arm 15A (or similarly the second holder arm 15B) is formed by a plate-shaped member having an approximately triangular plane shape with one of its corners round. A center of the round corner has a bearing hole 27A (27B) in which the semi-cylindrical cylinder shaft provided in the base plate 14 is rotatably fitted. A first pulley bearing 25A (25B) and a second pulley bearing 26A (26B) are provided with a predetermined interval between them on one edge of the holder arm 15A (15B). In a state where the holder arm 15A (15B) is assembled to the base plate 14, the first pulley bearing 25A (25B) is placed in the opening 24*a* (24*b*), and the second pulley bearing 26A (26B) is placed outside the fan-shaped part 14*a* (14*b*). In order to allow rotation of the holder arm 15A (15B), an outer periphery of the fan-shaped part 14*a* (14*b*) is formed in an arc shape.

The first pulley bearing 25A (25B) and the second pulley bearing 26A (26B) are formed protruding toward one surface of the holder arm 15A (15B). The pulley bearing 25A (25B) has a top bearing piece 25*a* provided at the top of the protrusion side and a bottom bearing piece 25*b* on the arm side facing the top bearing piece 25*a* (see FIG. 21). The top bearing piece 25*a* and the bottom bearing piece 25*b* are connected to each other by a leg piece, with a predetermined interval maintained between them. Similarly, the pulley bearing 26A (26B) has a top bearing piece 26*a* provided at the top of the protrusion side and a bottom bearing piece 26*b* on the arm side facing the top bearing piece 26*a* (FIG. 21). The top bearing piece 26*a* and the bottom bearing piece 26*b* are connected to each other by a leg piece, with a predetermined interval maintained between them.

Each of the top bearing pieces 25*a* and 26*a* and the bottom bearing pieces 25*b* and 26*b* has a laterally opening bearing hole. A first pulley shaft 28 is laid between the top bearing piece 25*a* and the bottom bearing piece 25*b* of the first pulley bearing 25A (25B) using these bearing holes and supported on both edges. A second pulley shaft 29 is laid between the top bearing piece 26*a* and the bottom bearing piece 26*b* of the second pulley bearing 26 by engaging the edges with the bearing holes and supported on both edges. A first pulley 22A (22B) is rotatably supported by the first pulley shaft 28, and a second pulley 23A (23B) is rotatably supported by the second pulley shaft 29.

The first pulley 22A (22B) and the second pulley 23A (23B) transfer the optical disk 2 by holding its multiple places from radially outside, and have a circumferentially continuous cyclic groove for this purpose on outer peripheries, respectively. A first output gear 31A (31B) is provided integrally with the first pulley 22A (22B), and a second output gear 32A (32B) is provided integrally with the second pulley 23A (23B). The first pulley 22A (22B) is identical to the second pulley 23A (23B), and the first output gear 31A (31B) is also identical to the second output gear 32A (32B).

Further, five shafts 33*a* to 33*e* are placed at predetermined positions on a surface of the folder arm 15A (15B) having the pulley bearings 25A (25B) and 26A (26B). Five intermediate gears 34*a* to 34*e* are rotatably supported by the five shafts 33*a* to 33*e*, respectively. The first intermediate gear 34*a* is placed to partially protrude into the bearing hole 27A (27B), and is meshed with the drive gear of the disk transfer mechanism 10 after assembly. The second intermediate gear 34*b* is meshed with the first intermediate gear 34*a*, and the first output gear 31A (31B) is meshed with the second intermediate gear 34*b*. The third intermediate gear 34*c* is meshed with the first output gear 31A (31B), and the fourth intermediate gear 34*d* is meshed with the third intermediate gear 34*c*. The fifth intermediate gear 34*e* is meshed with the fourth intermediate gear 34*d*, and the second output gear 32A (32B) is meshed with the fifth intermediate gear 34*e*.

In a state where the holder arm 15A (15B) is assembled to the base plate 14, in the pulley bearings 25A and 26A (25B and 26B), the output gears 31A and 32A (31B and 32B) protrude toward a surface of the base plate 14 having the bearing 21*a* (21*b*). The pulleys 22A and 23A (22B and 23B) provided integrally with the output gears 31A and 32A (31B and 32B) protrude toward an opposite surface of the base plate 14. Thus, when a rotating force is transmitted from the drive gear of the disk transfer mechanism 10 to the first intermediate gear 34a, the rotating force is transmitted to the first output gear 31A (31B) through the second intermediate gear 34b. Further, the rotating force transmitted to the first output gear 31A (31B) is transmitted from the third intermediate gear 34c through the fourth intermediate gear 34d and the fifth intermediate gear 34e to the second output gear 32A (32B). As a result, the first pulley 22A (22B) and the second pulley 23A (23B) are rotationally driven in an identical direction.

A lever shaft 35 is vertically provided on the surface of the folder arm 15A (15B) having the pulley bearings 25A and 26A (25B and 26B). The lever shaft 35 is placed between the bearing hole 27A (27B) and the first pulley bearing 25A (25B), and one edge of an approximately arc-shaped presser lever 36 is rotatably supported by the lever shaft 35. The presser lever 36 has a shape such that it may overlap at least either the five shafts 33a to 33e or the five intermediate gears 34a to 34e, and prevents dropout of any of the five intermediate gears 34a to 34e from the shafts 33a to 33e. The presser lever 36 is biased in the direction departing from the pulley bearing 25A (25B) by a third torsion spring 37 showing a specific example of an energizing member.

A coil of the third torsion spring 37 is attached to the lever shaft 35, one spring piece continuous with the coil is engaged with the holder arm 15A (15B), and a spring piece continuous with the other edge of the coil is engaged with the presser lever 36. Rotation of the presser lever 36 by the third torsion spring 37 is limited by an engaging part 38 provided in the holder arm 15A (15B). Further, the top of the presser lever 36 has an operating pin 39 penetrating the opening 24a (24b) of the holder arm 15A (15B) to protrude in a direction identical to that of the pulley bearings 25A and 26A (25B and 26B). The operating pin 39 is used to limit movement of the holder arm 15A (15B) to a front surface. The base plate 14 has a rotating lever 17A (17B) corresponding to the operating pin 39.

The rotating lever 17A (17B) is placed in the opening 24a (24b) of the base plate 14 and is rotatably supported by a pivot. The rotating lever 17A (17B) extends in the back-and-forth direction, and the pivot is provided in its longitudinal middle. The rotating lever 17A (17B) has a front edge biased inward by the second torsion spring 19A (19B), and has a rear edge moved away from an edge of the opening 24a (24b). A coil of the second torsion spring 19A (19B) is engaged with the base plate 14. One spring piece continuous with the coil of the torsion spring 19A (19B) is engaged with the top of the rotating lever 17A (17B), and a spring piece continuous with the other edge of the coil is engaged with the base plate 14.

A central support 14c is provided in a longitudinal middle of the base plate 14, protruding in a direction identical to that of the left and right fan-shaped parts 14a and 14b. The pair of operating levers 16A and 16B having the central support 14c as a rotation center is placed on the surface of the base plate 14 having the bearing 21a (21b). The pair of operating levers 16A and 16B are each formed by an approximately V-shaped lever-shaped member, and a guide pin 41 is provided in a longitudinal middle of the first operating lever 16A. A long hole 42 with which the guide pin 41 is slidably engaged is provided in a longitudinal middle of the second operating lever 16B.

Each of the pair of operating levers 16A and 16B has one longitudinal edge rotatably supported by each of a pair of pivots 43A and 43B provided in the central support 14c. The coils of the first torsion springs 18A and 18B are mounted on the pivots 43A and 43B, respectively. A spring piece continuous with one edge of the coil of the first torsion spring 18A or 18B is engaged with each of the operating levers 16A and 16B, and a spring piece continuous with the other edge of the coil is engaged with a spring receiving piece provided in the base plate 14. Each free edge of the pair of operating levers 16A and 16B is always biased forward by a spring force of the first torsion springs 18A and 18B.

Cam pins 44A and 44B to rotate the pair of holder arms 15A and 15B are provided at the tops of free edges of the pair of operating levers 16A and 16B. These cam pins 44A and 44B are slidably engaged with corresponding cam grooves provided in the holder arms 15A and 15B. As a result, the pair of holder arms 15A and 15B are interlockingly rotated around the bearings 21a and 21b as rotation centers by rotating the pair of operating levers 16A and 16B.

FIG. 18 shows an initial state of the disk transfer mechanism 10, where the pair of operating levers 16A and 16B crossed in an X shape are biased forward by a spring force of the first torsion springs 18A and 18B. Here, the free edges of the pair of operating levers 16A and 16B extend approximately parallel to a front edge of the base plate 14. The pair of holder arms 15A and 15B having the cam grooves with which the cam pins 44A and 44B are engaged are placed at the forefront, respectively, by an action of the cam pins 44A and 44B provided on the free edges of the pair of operating levers 16A and 16B. Here, the second pulleys 23A and 23B retained at the tops of the respective holder arms 15A and 15B are placed in notches formed between the left and right fan-shaped parts 14a and 14b and the central support 14c in the base plate 14.

When the disk transfer mechanism 10 is assembled to the enclosure 3, the disk transfer mechanism 10 is placed inside the disk entrance 9. Here, the base plate 14 of the disk transfer mechanism 10 is placed below a moving track of the optical disk 2 passing through the disk entrance 9. The left and right first pulleys 22A and 22B are located on the moving track of the optical disk 2 above the base plate 14, where the first pulleys 22A and 22B are supported by the first pulley bearings 25A and 25B of the pair of holder arms 15A and 15B placed on both right-and-left sides of the base plate 14. Further, the left and right second pulleys 23A and 23B and the operating pins 39 and 39 are located on the moving track of the optical disk 2, where the second pulleys 23A and 23B are supported by the second pulley bearings 26A and 26B, and the operating pins 39 and 39 are provided in the left and right presser levers 36 and 36. The first pulleys 22A and 22B are placed forward of the second pulleys 23A and 23B, and the second pulleys 23A and 23B are placed inward of the first pulleys 22A and 22B, backward of the first pulleys in the back-and-forth direction, and closer to each other than the first pulleys are.

FIGS. 18 to 20 describe an operation state of the disk transfer mechanism 10 viewed from below (from below the moving track of the optical disk 2). Specifically, FIG. 18 shows a state before the optical disk 2 is inserted into the disk entrance 9 (or after the optical disk 2 is ejected from the disk entrance 9). FIG. 19 shows a state when the optical disk 2 passes through the disk entrance 9 (when the optical disk 2 is inserted or ejected). FIG. 20 shows a state after the optical disk 2 passes through the disk entrance 9 (or before the optical disk 2 is ejected from the disk entrance 9).

When the optical disk 9 is inserted into the disk entrance 9, for example, from an initial state shown in FIG. 18, the optical disk 2 is first brought into contact with the pair of second pulleys 23A and 23B among the first and second pulleys 22A and 22B and 23A and 23B and pushes them backward.

Accordingly, the first holder arm 15A is rotated around the first bearing 21a as a rotation center counterclockwise in the figure. The second operating lever 16B is rotated around the second pivot 43B as a rotation center clockwise in the figure interlockingly with rotation of the first holder arm 15A and against a spring force of the first torsion spring 18B. At the same time, the second holder arm 15B is rotated around the second bearing 21b as a rotation center clockwise in the figure. The first operating lever 16A is rotated around the first pivot 43A as a rotation center counterclockwise in the figure interlockingly with rotation of the second holder arm 15B and against a spring force of the first torsion spring 18A. Here, since the guide pin 41 of the first operating lever 16A is moved in the long hole 42 of the second operating lever 16B, the left and right operating levers 16A and 16B may be surely and smoothly rotated.

Next, when the optical disk 2 is inserted to a certain extent as in an intermediate state shown in FIG. 19, the optical disk 2 is brought into contact with the pair of first pulleys 22A and 22B and pushes them backward. Accordingly, the pair of second pulleys 23A and 23B are moved away from the optical disk 2, the first holder arm 15A is further rotated counterclockwise, and the second holder arm 15B is further rotated clockwise. The second operating lever 16B is further rotated clockwise against a spring force of the first torsion spring 18B by rotation of the first holder arm 15A and the second holder arm 15B. Further, the first operating lever 16A is further rotated counterclockwise against a spring force of the first torsion spring 18A.

When the optical disk 2 is further pushed (or drawn) and approaches a final state as shown in FIG. 20, the optical disk 2 is again moved away from the pair of first pulleys 22A and 22B and brought into contact with the pair of second pulleys 23A and 23B. Accordingly, the first holder arm 15A is further rotated counterclockwise, and the second holder arm 15B is further rotated clockwise. Thereafter, although not shown, when the disk 2 is transferred to the disk mounting part, the pair of second pulleys 23A and 23B are moved away from the optical disk 2 (not shown). Then, the pair of holder arms 15A and 15B are locked in a state that both the first pulleys 22A and 22B and the second pulleys 23A and 23B are separated from the optical disk 2.

In the locked state of the pair of holder arms 15A and 15B, the optical disk 2 is mounted on the disk mounting part. Accordingly, an information signal may be recorded (written) on and/or reproduced (read) from the optical disk 2 mounted on the disk mounting part.

Here, a transfer state of the optical disk 2 is detected by a disk transfer detecting part (not shown). A limit switch that is turned on and off by movement of the optical disk 2, or a position detecting sensor may be used as the disk transfer detecting part, for example. Movement of the later-described stopper advancing/retracting mechanism is controlled for example, based on a detection signal of the disk transfer detecting part, and the optical disk 2 is selectively transferred to the disk ejection part and the disk mounting part.

The optical disk 2 after recording and reproduction of the information signal is transferred by the disk transfer mechanism 10 and ejected from the disk entrance 9 by an operation reverse to the aforementioned operation.

Figure 5:
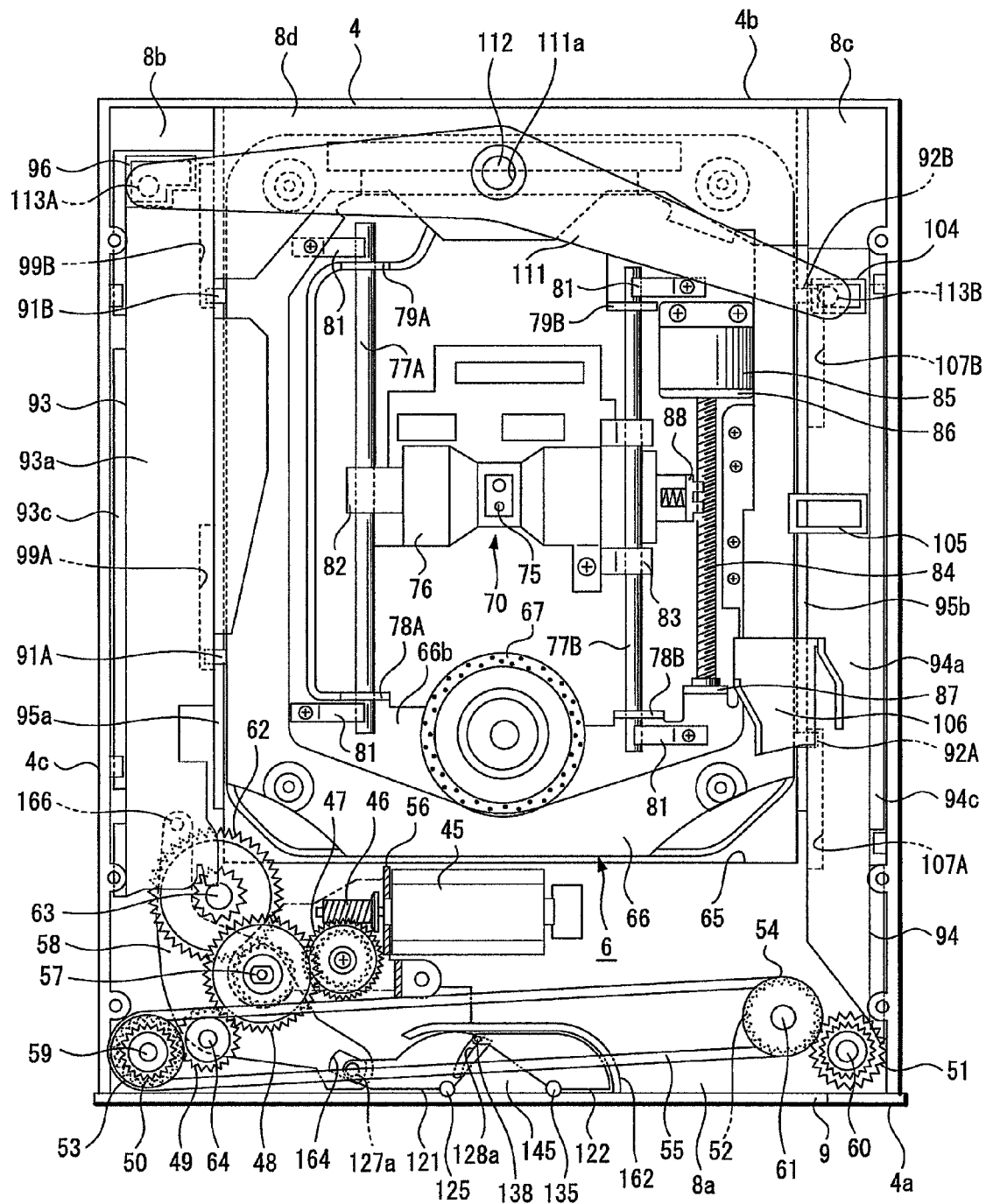
FIG. 5 is a plan view showing an internal structure of an example of a disk recording/reproducing apparatus according to a disk recording and/or reproducing apparatus according to an embodiment of the present invention before insertion of a disk-shaped recording medium.
Figure 6:
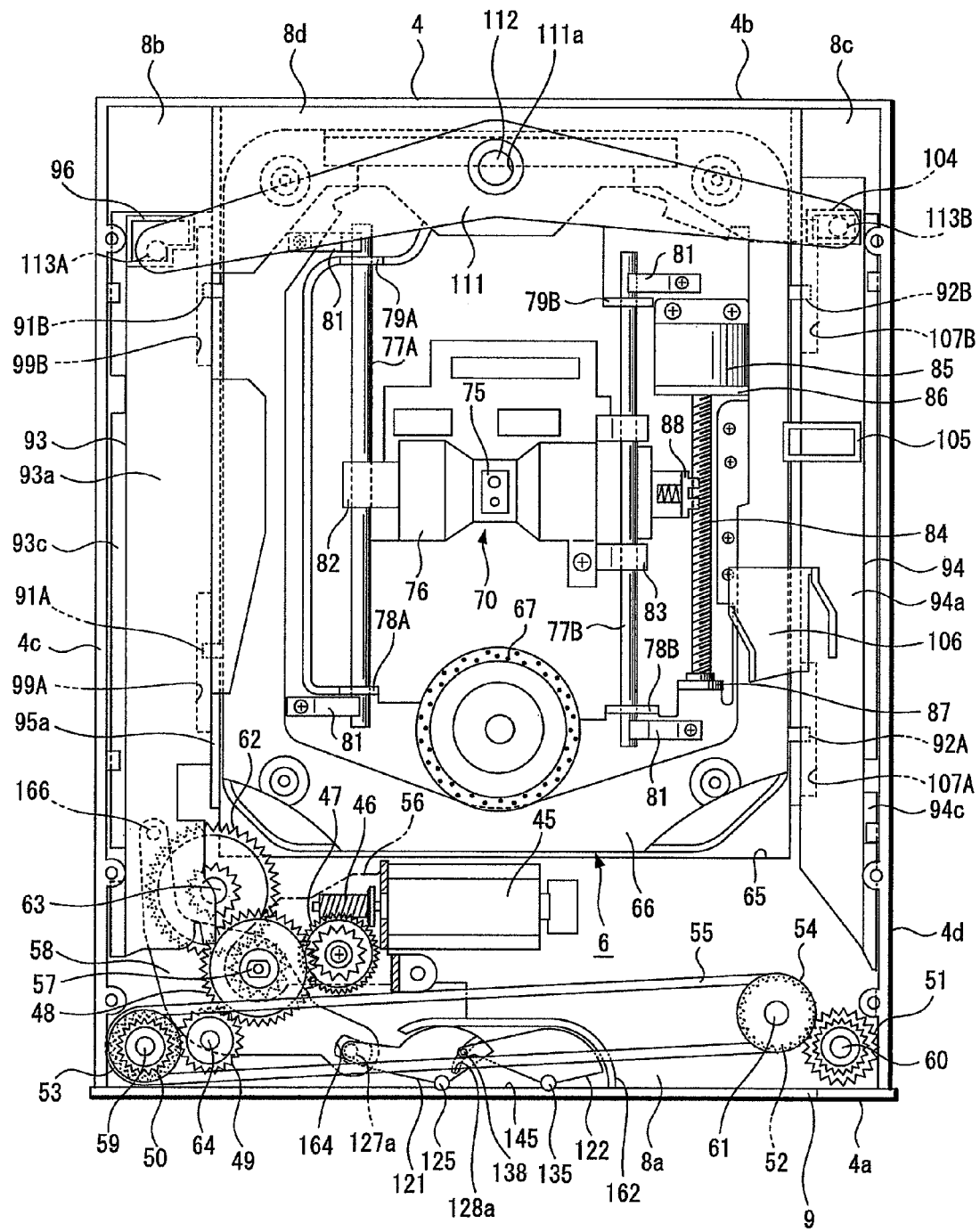
FIG. 6 is a plan view showing an internal structure of an example of a disk recording/reproducing apparatus according to a disk recording and/or reproducing apparatus according to an embodiment of the present invention during insertion of a disk-shaped recording medium.
Figure 7:
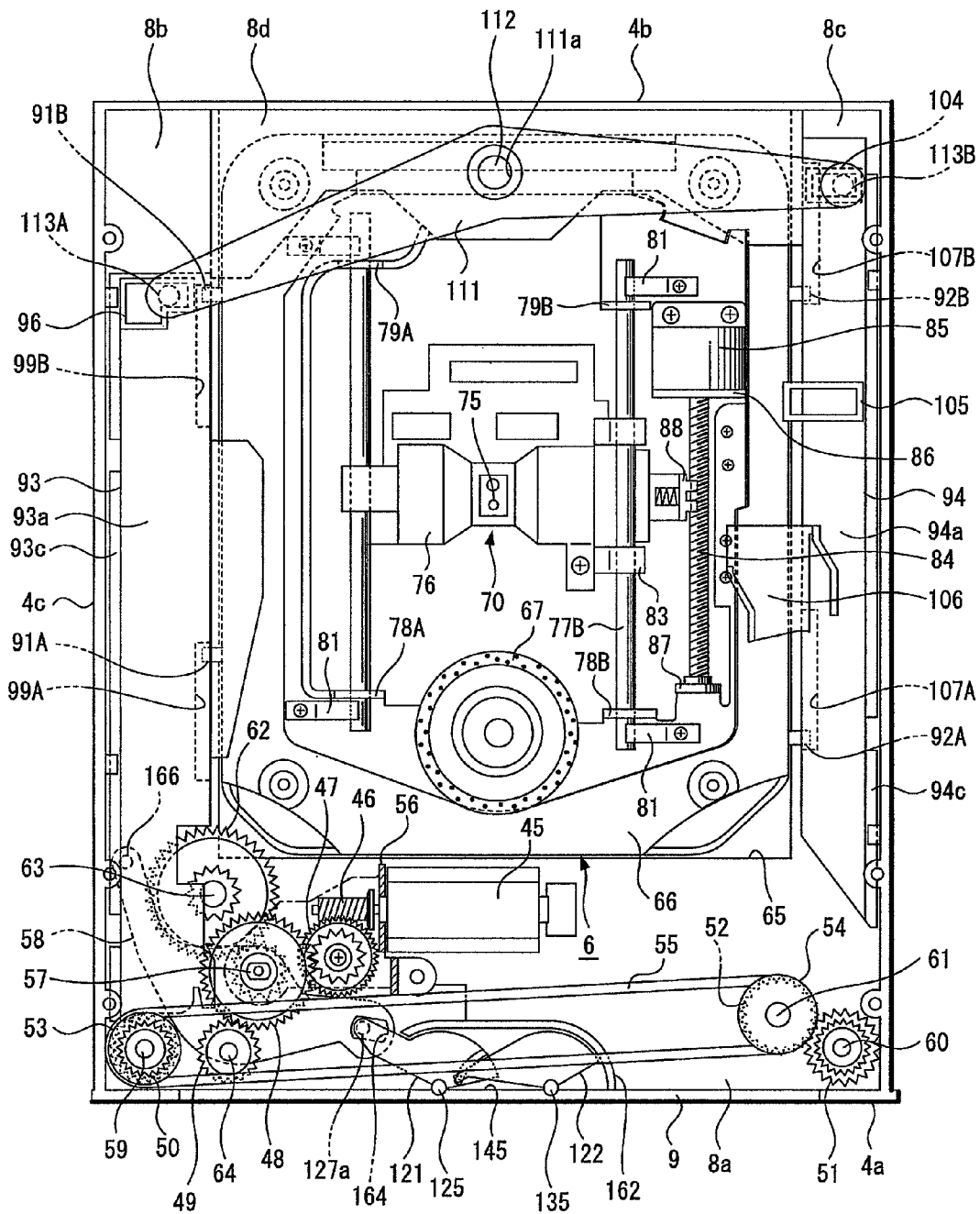
FIG. 7 is a plan view showing an internal structure of an example of a disk recording/reproducing apparatus according to a disk recording and/or reproducing apparatus according to an embodiment of the present invention after insertion of a disk-shaped recording medium.

As shown in FIGS. 5 to 7, the power section of the disk transfer mechanism 10 transferring the optical disk 2 in this manner is placed on the front shelf 8a of the main chassis 4. The motor section of the disk transfer mechanism 10 has one drive motor 45, a worm 46 fixed to a rotating shaft of the drive motor 45, six gears 47 to 52, and two pulleys 53 and 54. The two pulleys 53 and 54 are power-transmittably connected to each other by an endlessly continuous rubber belt 55 showing a specific example of a power transmission medium. The drive motor 45 is fixed to the front shelf 8a through a motor bracket 56 with a shaft center line of its rotating shaft directed in the right-and-left direction. The drive motor 45 is placed in an approximate center of the front shelf 8a in the right-and-left direction, and a motor bracket 56 is screwed to one edge surface of the drive motor 45.

The first gear 47 having a large diameter gear and a small diameter gear integrally provided is rotatably supported by the motor bracket 56. The large diameter gear provided in a lower part of the first gear 47 is meshed with the worm 46, and the small diameter gear provided in an upper part is meshed with a large diameter gear provided in an upper part of the second gear 48. The second gear 48 is rotatably supported by a first support shaft 57 provided in the main chassis 4. A rocker lever 58 is also rotatably supported by the first support shaft 57. A rotating shaft 64 is vertically provided in the rocker lever 58, and the third gear 49 is rotatably supported by the rotating shaft 64. The third gear 49 is meshed with the large diameter gear of the second gear 48, and may be rotationally displaced within a predetermined range outside the second gear 48 according to rotation of the rocker lever 58, with the third gear 49 meshed with the large diameter gear.

The third gear 49 is meshed with a small diameter gear provided in a lower part of the fourth gear 50 on one edge in a rotating direction of the rocker lever 58. Accordingly, the rotating force of the drive motor 45 transmitted to the third gear 49 is transmitted from the third gear 49 to the fourth gear 50. In contrast, when the rocker lever 58 is rotated in a reverse direction, the third gear 49 is detached from the small diameter gear of the fourth gear 50 and the meshed state is released. Accordingly, the third gear 49 is idle, and the rotating force of the drive motor 45 transmitted to the third gear 49 is not transmitted to the fourth gear 50.

A large diameter gear is integrally provided in an upper part of the fourth gear 50, and the first pulley 53 is integrally provided between the large diameter gear and a small diameter gear. A second support shaft 59 to rotatably support the first pulley 53 is vertically provided on one corner of the front shelf 8a of the main chassis 4. A third support shaft 60 is vertically provided on the other corner of the front shelf 8a symmetrically with the second support shaft 59. The fifth gear 51 is rotatably supported by the third support shaft 60. The fifth gear 51 has a small diameter gear provided in an upper part and a large diameter gear provided in a lower part. A fourth support shaft 61 is vertically provided near the third support shaft 60 on the front shelf 8a. The sixth gear 52 is rotatably supported by the fourth support shaft 61, and the second pulley 54 is provided integrally with an upper part of the sixth gear 52. The rubber belt 55 is power-transmittably stretched between the second pulley 54 and the first pulley 53.

A small diameter gear is provided in a lower part of the second gear 48, and a large diameter gear of the seventh gear 62 is meshed with the small diameter gear. The seventh gear 62 is rotatably supported by a fifth support shaft 63 vertically provided on the front shelf 8a. A small diameter gear is integrally provided in an upper part of the large diameter gear of the seventh gear 62, and a rack 98 of a later-described first slide cam member 93 is detachably meshed with the small diameter gear.

Thus, when the drive motor 45 is driven, a rotating force of its rotating shaft is transmitted from the worm 46 to the large diameter gear of the first gear 47 and is transmitted from the small diameter gear of the first gear 47 to the large diameter gear of the second gear 48. Further, the rotating force transmitted to the second gear 48 is transmitted from its large diameter gear through the third gear 49 to the small diameter gear of the fourth gear 50, when the third gear 49 is meshed with the fourth gear 50. In contrast, when the third gear 49 is detached from and not meshed with the fourth gear 50, the rotating force is not transmitted to the fourth gear 50.

The rotating force transmitted to the fourth gear 50 is transmitted from the large diameter gear as its drive gear to the first intermediate gear 34a of the holder arm 15A on one hand, and is transmitted from the first pulley 53 to the rubber belt 55 on the other hand. The second pulley 54 is rotationally driven by the rotating force transmitted to the rubber belt 55. Accordingly, the sixth gear 52 integrated with the second pulley 54 is rotationally driven, and the rotating force is transmitted to the large diameter gear of the fifth gear 51. As a result, the rotating force is transmitted from the small diameter gear (drive gear) of the fifth gear 51 to the first intermediate gear 34a of the holder arm 15B.

An approximately rectangular opening 65 is provided in a center of the main chassis 4, which is surrounded by the front shelf 8a, the left and right sliding parts 8b and 8c and the rear surface 4b. The rear shelf 8d provided in a rear part of the main chassis 4 is placed at a position one-step higher to cover the opening 65 from above. The disk drive device 6 is placed in the opening 65 of the main chassis 4. The disk drive device 6 is attitude-changeably supported by the main chassis 4, so that it may be rotated in the back-and-forth direction with a right-and-left horizontal state maintained.

As shown in FIGS. 5 to 7 and 9, the disk drive device 6 includes an approximately rectangular parallelepiped flat frame-shaped drive holder 66, a spindle motor 68, an optical pickup 70, and a pickup moving mechanism 71. The spindle motor 68 has a turntable 67 and is fixed to the drive holder 66. The optical pickup 70 is movably supported by the drive holder 66. The optical pickup 70 may be moved by the pickup moving mechanism 71.

The drive holder 66 has an approximately rectangular frame-shaped upper surface 66a, a lower surface 66b provided facing the upper surface 66a with a predetermined interval between them, and a side surface 66c connecting an outer periphery of the upper surface 66a to an outer periphery of the lower surface 66b to surround a side surface. The spindle motor 68 is placed in an approximate widthwise center on one longitudinal side of the drive holder 66. The spindle motor 68 is screwed to the lower surface 66b with a rotating shaft directed upward. A stepping motor or a DC motor may be used as the spindle motor 68, for example.

Figure 17A:
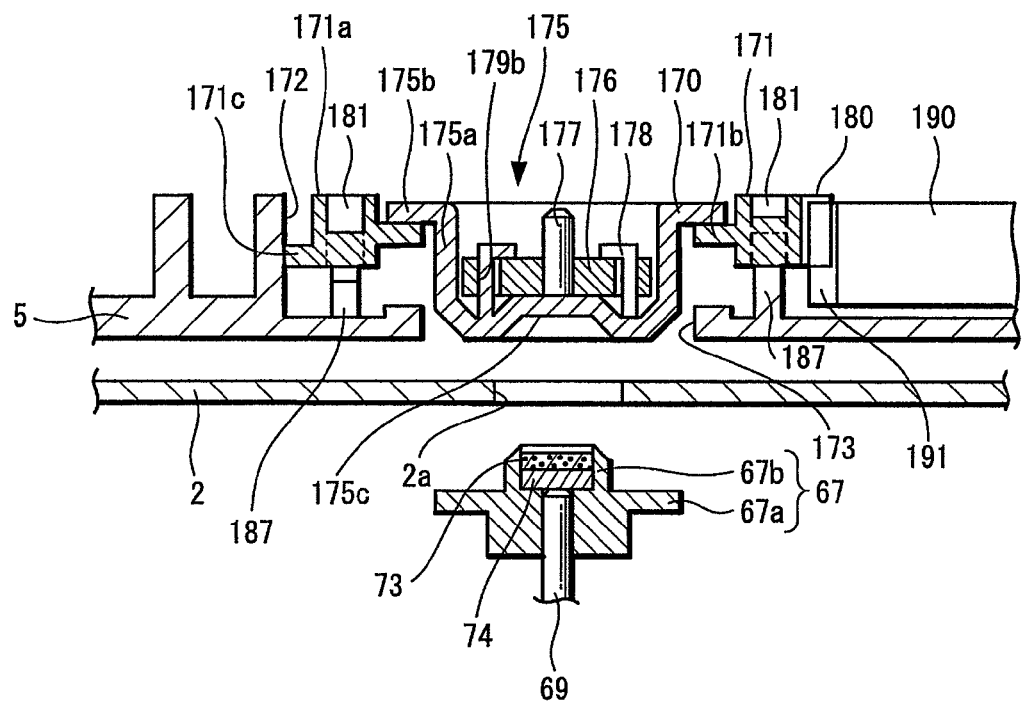
FIG. 17A is a view describing a state where the clamp member is separated from the turntable.
Figure 17B:
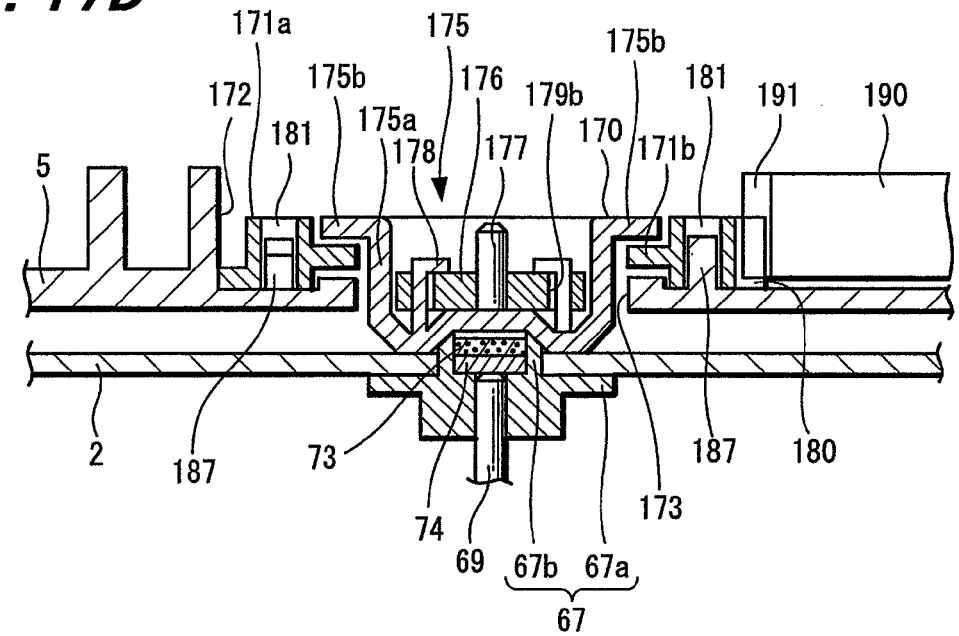
FIG. 17B is a view describing a state where the clamp member is attracted to the turntable.

As shown in FIGS. 17A and 17B, the turntable 67 as the disk mounting part is fixed to an upper part of a rotating shaft 69 of the spindle motor 68, and these members are integrated in a rotating direction. The turntable 67 has a mounting part 67a on which a periphery of a center hole 2a of the optical disk 2 is mounted, and a fitting part 67b fitted in the center hole 2a. The mounting part 67a of the turntable 67 has a disk shape slightly larger in diameter than the center hole 2a of the optical disk 2, and the fitting part 67b protruding upward is provided in its center part.

The fitting part 67b of the turntable 67 has a size corresponding to that of the center hole 2a of the optical disk 2. A magnet 73 and a yoke 74 that are ring-shaped are incorporated in the fitting part 67b, and a later-described clamp member is attracted to the turntable 67 by an attracting force of the magnet 73. Accordingly, the optical disk 2 mounted on the turntable 67 is held between the clamp member and the turntable 67, and they are integrated in a rotating direction. The optical pickup 70 is configured to approach and depart from the turntable 67 within a predetermined range by actuation of the pickup moving mechanism 71.

The optical pickup 70 is formed including for example: a biaxial actuator having an objective lens 75; a semiconductor laser generating laser light; and a photodetector receiving the laser light returned by reflection on an information recorded surface of an optical disk. The biaxial actuator moves the objective lens 75 in a focus direction (a direction perpendicular to the information recorded surface) and a tracking direction (a direction horizontal to the information recorded surface) to focus the objective lens 75 on the information recorded surface. An electromagnetic force is exclusively used as a driving force of the biaxial actuator. Such biaxial actuators are classified into a plate spring type, a wire-supported type, a hinge type and a shaft sliding type, for example, depending on the support system for moving parts. The biaxial actuator is mounted on a slide member 76, so that the objective lens 75 faces the information recorded surface of the optical disk 2 mounted on the turntable 67.

The slide member 76 is formed by a space housing the biaxial actuator, and a horizontally long block-shaped member having an optical path through which laser light passes. The semiconductor laser, the photodetector and the like are placed on the optical path and are fixed. Two guide shafts 77A and 77B penetrate both sides in a longitudinal direction of the slide member 76 in a direction perpendicular to the longitudinal direction. The two guide shafts 77A and 77B are parallel to each other and span over an opening of the drive holder 66 longitudinally.

One edge of each of the two guide shafts 77A and 77B is placed on each side of the spindle motor 68 to hold it and is supported by a front bearing piece 78A or 78B provided on the lower surface 66b. The other edge of each of the two guide shafts 77A and 77B is supported by a rear bearing piece 79A or 79B similarly provided on the lower surface 66b. Each edge of the two guide shafts 77A and 77B is biased by a plate spring 81 fixed to the lower surface 66b, thus allowing positioning at a predetermined position and absorption of vibration, for example.

The first guide shaft 77A among the two guide shafts 77A and 77B slidably penetrates a first bearing 82 provided on one longitudinal side of the slide member 76. The first bearing 82 has a bearing groove formed by a recess having a U-shaped cross-section, and the first guide shaft 77A is slidably engaged in the bearing groove. The second guide shaft 77B slidably penetrates a second bearing 83 provided on the other longitudinal side of the slide member 76. The second bearing 83 has two bearing projections provided with a predetermined interval between them along an axis of the second guide shaft 77B, and a round bearing hole is provided in each of the bearing projections. The second guide shaft 77B is slidably inserted into the two bearing holes.

A feed screw shaft 84 having a shaft center line parallel to a shaft center line of the second guide shaft 77B is placed on a side of the second guide shaft 77B opposite to the first guide shaft 77A. The feed screw shaft 84 forms a rotating shaft of a feed motor 85. A stepping motor or a DC motor may be used as the feed motor 85, for example. The feed motor 85 is screwed to a motor bracket 86 formed to be bent in an L shape, and the motor bracket 86 is similarly screwed to the lower surface 66b. The top of the feed screw shaft 84 is rotatably supported by a bearing piece 87 provided near the front bearing piece 78B of the lower surface 66b. A feed nut 88 provided in the slide member 76 is slidably engaged with the feed screw shaft 84.

The pickup moving mechanism 71 is formed including the two guide shafts 77A and 77B, the feed screw shaft 84, and the feed motor 85. The pickup moving mechanism 71 is operated based on a control signal supplied from a control unit (not shown). As a result, the optical pickup 70 is operated as follows. When the feed screw shaft 84 is rotated by driving the feed motor 85, its rotation force is transmitted from the feed nut 88 to the slide member 76. Accordingly, the optical pickup 70 is guided by the two guide shafts 77A and 77B and is moved in a direction to approach the turntable 67 or depart from the turntable 67, according to a rotating direction of the feed screw shaft 84. During movement of the optical pickup 70, an information signal is recorded (written) on and/or reproduced (read) from the information recorded surface of the optical disk 2.

As shown in FIGS. 5 to 7 and 9, two cam pins 91A and 91B or 92A and 92B protruding laterally are provided on each side in the right-and-left direction of the side surface 66c in the drive holder 66 of the disk drive device 6 having such a configuration. The pair of first cam pins 91A and 91B placed on a left side surface as a first surface and the pair of second cam pins 92A and 92B placed on a right side surface as a second surface are formed by placing identical cam pins at point-symmetrical positions.

In this example, a heightwise position of the first rear cam pin 91B remote from the spindle motor 68 among the pair of first cam pins 91A and 91B is set higher than a heightwise position of the first front cam pin 91A close to the spindle motor 68, with a height step provided in the back-and-forth direction. In contrast, a heightwise position of the second front cam pin 92A close to the spindle motor 68 among the pair of second cam pins 92A and 92B is set higher than a heightwise position of the second rear cam pin 92B remote from the spindle motor 68, with a height step provided in the back-and-forth direction. The first front cam pin 91A is equal in height to the second rear cam pin 92B, and the first rear cam pin 91B is equal in height to the second front cam pin 92A.

The first slide cam member 93 is placed facing a left side surface of the drive holder 66 having such a configuration, and a second cam member 94 is placed facing a right side surface of the drive holder 66. The first slide cam member 93 is housed slidably in the back-and-forth direction in the left sliding part 8b of the main chassis 4. The second slide cam member 94 is housed slidably in the back-and-forth direction in the right sliding part 8c of the main chassis 4. As shown in FIG. 8, first notches 115a and 115b into which the first cam pins 91A and 91B provided in the drive holder 66 are inserted are provided in two corresponding places on a first partition wall 95a forming a partition between the left sliding part 8b and the central opening 65. Similarly, second notches 116a and 116b into which the second cam pins 92A and 92B provided in the drive holder 66 are inserted are provided in two corresponding places on a second partition wall 95b forming a partition between the right sliding part 8c and the central opening 65.

Figure 9:
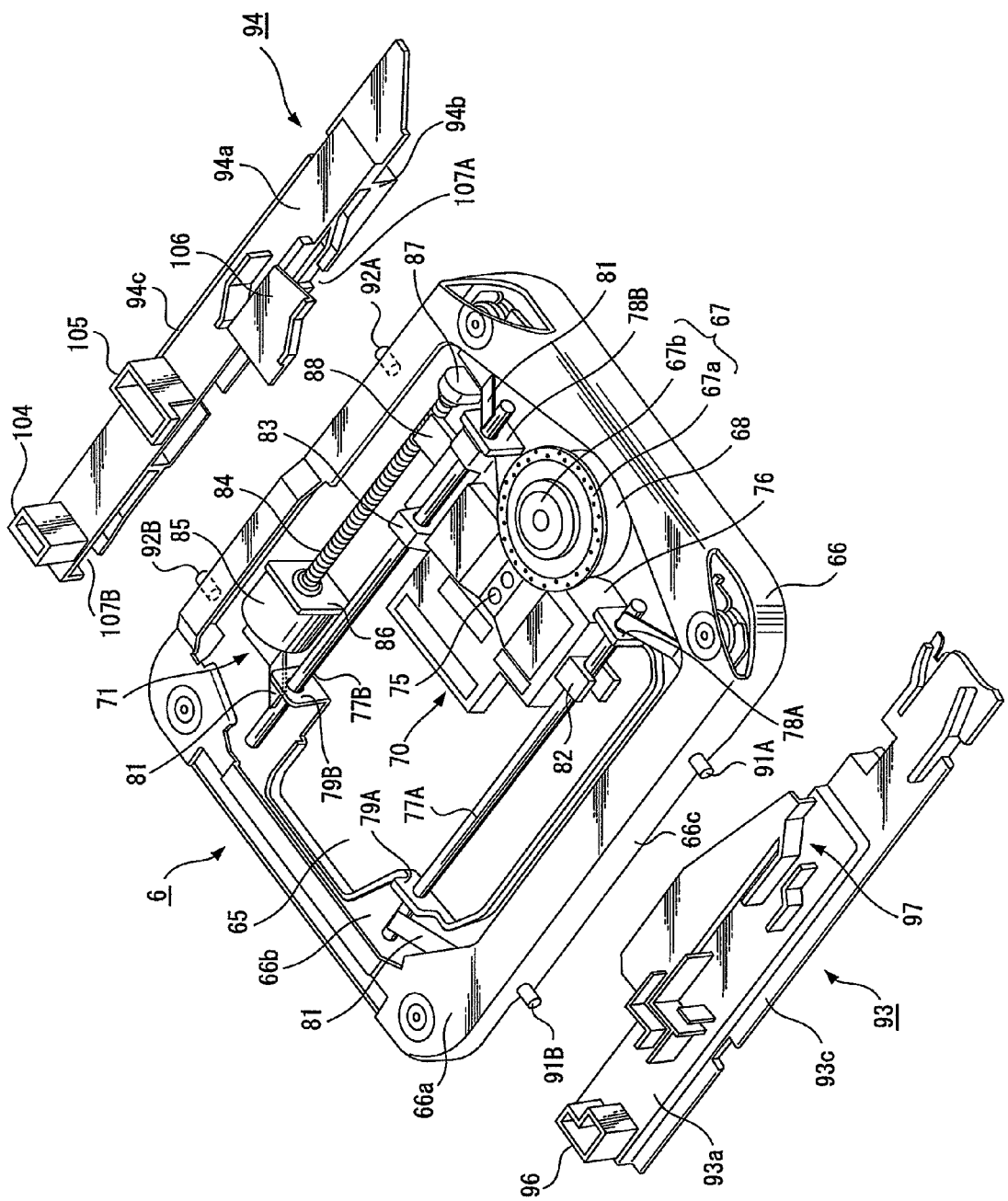
FIG. 9 is a perspective view showing a disk drive device and a pair of slide cam members of an example of a disk recording/reproducing apparatus according to a disk recording and/or reproducing apparatus according to an embodiment of the present invention.
Figure 10:
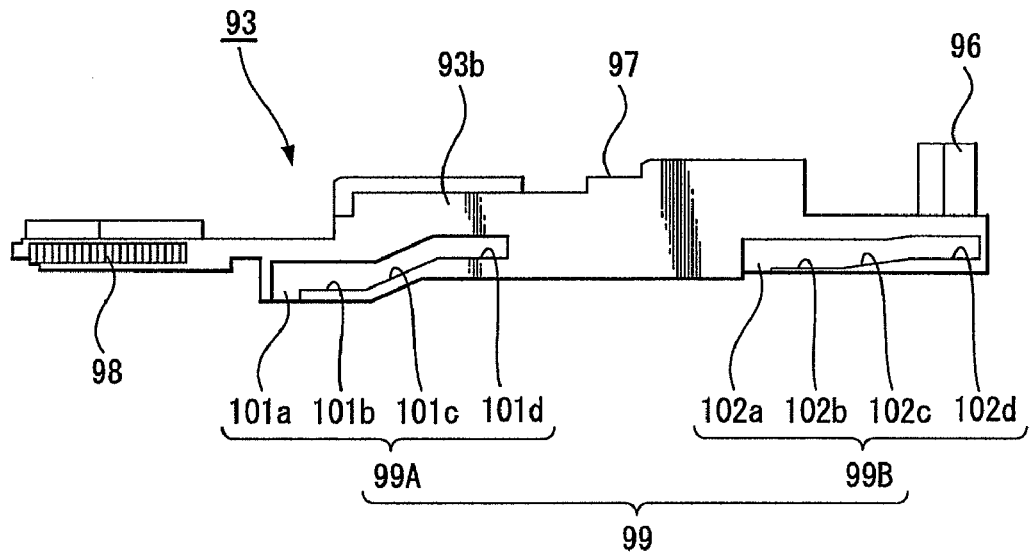
FIG. 10 is a side view of a first slide cam member of a disk recording/reproducing apparatus according to a disk recording and/or reproducing apparatus according to an embodiment of the present invention.

The first slide cam member 93 has a shape and a configuration as shown in FIGS. 9 and 10. Specifically, the first slide cam member 93 is formed by a bar having an approximately U-shaped cross-section, which has an elongated plate-shaped upper surface 93a, an inner side surface 93b provided continuously with one widthwise side of the upper surface 93a, and an outer side surface 93c provided continuously with the other widthwise side of the upper surface 93a. The upper surface 93a of the first slide cam member 93 has a first connecting support 96 rotatably supporting one edge of a later-described interlocking link, and an upper cam 97 rotating a later-described actuating lever. The first connecting support 96 is placed on a rear edge which is one longitudinal side of the upper surface 93a, and the upper cam 97 is placed in a longitudinal middle of the upper surface 93a.

The inner side surface 93b of the first slide cam member 93 has: the rack 98 which may be meshed with the small diameter gear of the seventh gear 62; and a first cam 99 slidably engaged with the first cam pins 91A and 91B provided in the drive holder 66. As shown in FIG. 10, the rack 98 of the first slide cam member 93 is provided within a predetermined range in the back-and-forth direction at the top of the inner side surface 93b opposite to the connecting support 96. The first cam 99 is formed by a first front cam 99A placed on a front side close to the rack 98 which is one longitudinal side of the inner side surface 93b, and a first rear cam 99B placed on a rear side close to the connecting support 96. The first front cam pin 91A is engaged with the first front cam 99A, and the first rear cam pin 91B is engaged with the first rear cam 99B.

The first front cam 99A has an insertion opening 101a opening downward, a lower horizontal part 101b horizontally extending rearward from an upper part of the insertion opening 101a, an inclined surface 101c, and an upper horizontal part 101d. The inclined surface 101c extends obliquely upward from a rear part of the lower horizontal part 101b, and the upper horizontal part 101d horizontally extends rearward from an upper part of the inclined surface 101c. Similarly, the first rear cam 99B has an insertion opening 102a opening downward, a lower horizontal part 102b horizontally extending rearward from an upper part of the insertion opening 102a, an inclined surface 102c, and an upper horizontal part 102d. The inclined surface 102c extends obliquely upward from a rear part of the lower horizontal part 102b, and the upper horizontal part 102d horizontally extends rearward from an upper part of the inclined surface 102c.

In a state where the first slide cam member 93 is horizontal, the upper horizontal part 101d of the first front cam 99A and the upper horizontal part 102d of the first rear cam 99B are set at positions having an equal height. In contrast, the lower horizontal part 101b of the first front cam 99A is set at a position lower than the lower horizontal part 102b of the first rear cam 99B, and is formed to correspond to the step provided between the first front cam pin 91A and the first rear cam pin 91B.

The outer side surface 93c of the first slide cam member 93 has a laterally protruding flange by forming an L-shaped cross-section. The flange of the outer side surface 93c is used for preventing dropout of the first slide cam member 93 from the left sliding part 8b. After assembly, a retainer piece provided in the main chassis 4 is engaged with the flange to retain the first slide cam member 93.

Figure 11:
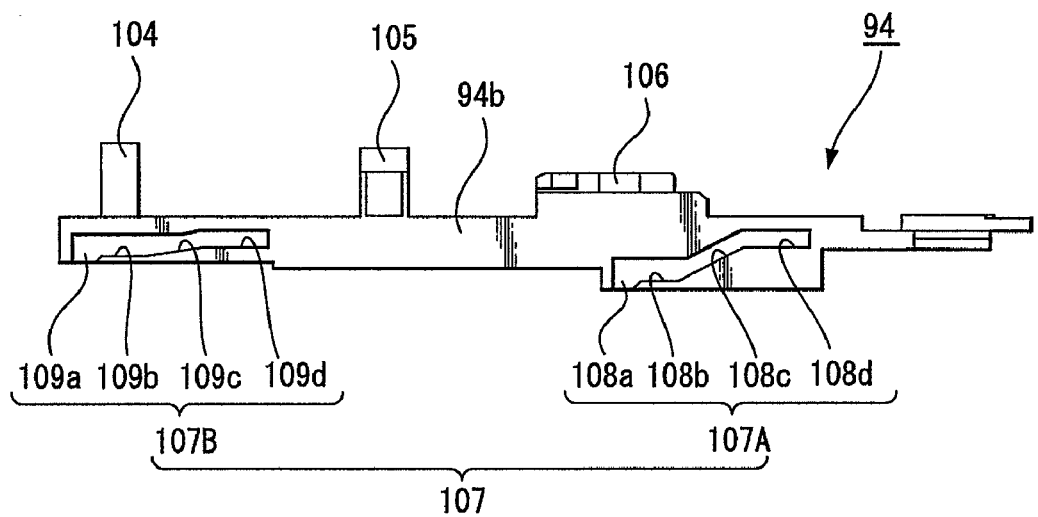
FIG. 11 is a side view of a second slide cam member of a disk recording/reproducing apparatus according to a disk recording and/or reproducing apparatus according to an embodiment of the present invention.

The second slide cam member 94 has a shape and a configuration as shown in FIGS. 9 and 11. Specifically, the second slide cam member 94 is a bar having an approximately U-shaped cross-section, which has an elongated plate-shaped upper surface 94a, an inner side surface 94b provided continuously with one widthwise side of the upper surface 94a, and an outer side surface 94c provided continuously with the other widthwise side of the upper surface 94a. The upper surface 94a of the second slide cam member 94 has a second connecting support 104 rotatably supporting the other edge of the interlocking link, a lever support 105 rotating a later-described drive lever, and an arm operating part 106 rotating a later-described first support arm. The second connecting support 104 is placed on a rear edge, which is one longitudinal side of the upper surface 94a, and the arm operating part 106 is placed in a longitudinal middle of the upper surface 94a. The lever support 105 is placed between the second connecting support 104 and the arm operating part 106.

The inner side surface 94b of the second slide cam member 94 has a second cam 107 slidably engaged with the second cam pins 92A and 92B provided in the drive holder 66. As shown in FIG. 11, the second cam 107 is formed by a second front cam 107A placed on a front side facing the arm operating part 106 which is one longitudinal side of the inner side surface 94b, and a second rear cam 107B placed on a rear side close to the second connecting support 104. The second front cam pin 92A is engaged with the second front cam 107A, and the second rear cam pin 92B is engaged with the second rear cam 107B.

The second front cam 107A has an insertion opening 108a opening downward, a lower horizontal part 108b horizontally extending forward from an upper part of the insertion opening 108a, an inclined surface 108c, and an upper horizontal part 108d. The inclined surface 108c extends obliquely upward from a front part of the lower horizontal part 108b, and the upper horizontal part 108d horizontally extends forward from an upper part of the inclined surface 108c. Similarly, the second rear cam 107B has an insertion opening 109a opening downward, a lower horizontal part 109b horizontally extending forward from an upper part of the insertion opening 109a, an inclined surface 109c, and an upper horizontal part 109d. The inclined surface 109c extends obliquely upward from a front part of the lower horizontal part 109b, and the upper horizontal part 109d horizontally extends forward from an upper part of the inclined surface 109c.

In a state where the second slide cam member 94 is horizontal, the upper horizontal part 108d of the second front cam 107A and the upper horizontal part 109d of the second rear cam 107B are set at positions having an equal height. In contrast, the lower horizontal part 108b of the second front cam 107A is set at a position lower than the lower horizontal part 109b of the second rear cam 107B, and is formed to correspond to the step provided between the second front cam pin 92A and the second rear cam pin 92B. The first front cam 99A has an internal configuration reverse to that of the second front cam 107A, and the first rear cam 99B has an internal configuration reverse to that of the second rear cam 107B.

Further, the outer side surface 94c of the second slide cam member 94 has a laterally protruding flange by forming an L-shaped cross-section. The flange of the outer side surface 94c is used for preventing dropout of the second slide cam member 94 from the right sliding part 8c. After assembly, a retainer piece provided in the main chassis 4 is engaged with the flange to retain the second slide cam member 94.

FIGS. 5 to 7 show a state where the first slide cam member 93 is assembled to the left sliding part 8b of the main chassis 4, and the second slide cam member 94 is assembled to the right sliding part 8c. A first coil spring 117A is housed in the left sliding part 8b with its center line directed in the back-and-forth direction, and a second coil spring 117B is housed in the right sliding part 8c with its center line directed in the back-and-forth direction. The first coil spring 117A and the second coil spring 117B are maintained to be free or a little compressed, respectively. The slide cam members 93 and 94 have spring-loaded projections (not shown) corresponding to these coil springs, respectively.

In the first slide cam member 93, the spring-loaded projection is placed rearward of the first coil spring 117A. When the first slide cam member 93 is moved forward, the spring-loaded projection compresses the first coil spring 117A. On the other hand, in the second slide cam member 94, the spring-loaded projection is placed forward of the second coil spring 117B. When the second slide cam member 94 is moved rearward, the spring-loaded projection compresses the second coil spring 117B. Accordingly, the first slide cam member 93 is placed rearward of the left sliding part 8b, and the second slide cam member 94 is placed forward of the right sliding part 8c, usually.

The left and right slide cam members 93 and 94 assembled in this manner are interlockably connected to each other by the interlocking link 111. The interlocking link 111 is formed by a V-shaped link member, and a bearing hole 111a is provided in its longitudinal middle. A rotating shaft 112 provided on the rear shelf 8d of the main chassis 4 is rotatably fitted in the bearing hole 111a of the interlocking link 111. The interlocking link 111 is rotatably supported by the main chassis 4 through the rotating shaft 112.

A first connecting pin 113A is provided on one longitudinal edge of the interlocking link 111, and a second connecting pin 113B is provided on the other longitudinal edge. One side of the interlocking link 111 extends above the first slide cam member 93, and the first connecting pin 113A is connected to its first connecting support 96 movably within a predetermined range. The other side of the interlocking link 111 extends above the second slide cam member 94, and the second connecting pin 113B is connected to its second connecting support 104 movably within a predetermined range.

Here, the "predetermined range" within which the first connecting pin 113A or the second connecting pin 113B may be moved refers to a space having a size and a shape allowing an amount of rotation of the interlocking link 111. Such a size and a shape allow an amount of rotation of the interlocking link 111 which may be needed to move the first slide cam member 93 or the second slide cam member 94 a predetermined distance in the back-and-forth direction. In this example, the first connecting support 96 is L-shaped and the second connecting support 104 is I-shaped. Accordingly, the first connecting pin 113A may be moved in the back-and-forth direction and the right-and-left direction in a predetermined amount in the first connecting support 96 by turning the interlocking link 111 horizontally. The second connecting pin 113B may be moved only in the right-and-left direction in a predetermined amount in the second connecting support 104 by turning the interlocking link 111 horizontally.

As shown in FIGS. 5 to 7, the front shelf 8a of the main chassis 4 has a disk misinsertion preventing mechanism 120 preventing excessive insertion of the optical disk 2. When the first optical disk 2 is mounted on the disk mounting part, the disk misinsertion preventing mechanism 120 closes the disk entrance 9 to prevent insertion of the second optical disk 2 into the enclosure 3. The disk misinsertion preventing mechanism 120 is formed by two stopper members 121 and 122, and the stopper advancing/retracting mechanism 11 moving the two stopper members 121 and 122 forward and rearward to open and close the disk entrance 9. When the optical disk 2 is mounted on the disk mounting part, the two stopper members 121 and 122 protrude into the disk entrance 9 through which the optical disk 2 may usually pass to block passage of the optical disk 2.

In this example, the disk misinsertion preventing mechanism 120 having two stopper members will be described. However, the mechanism may have only one stopper member, or may have three or more stopper members. When the mechanism has three or more stopper members, the three or more stopper members may interlockingly open and close the disk entrance 9.

As shown in FIGS. 22 to 32, the two stopper members 121 and 122 are placed side-by-side inside the front surface 4a of the main chassis 4. Stoppers 125a and 135a of the two stopper members 121 and 122 are allowed to enter and exit the disk entrance 9 to control passage of the optical disk 2 by moving the two stopper members 121 and 122 up and down by the stopper advancing/retracting mechanism 11.

Figure 27:
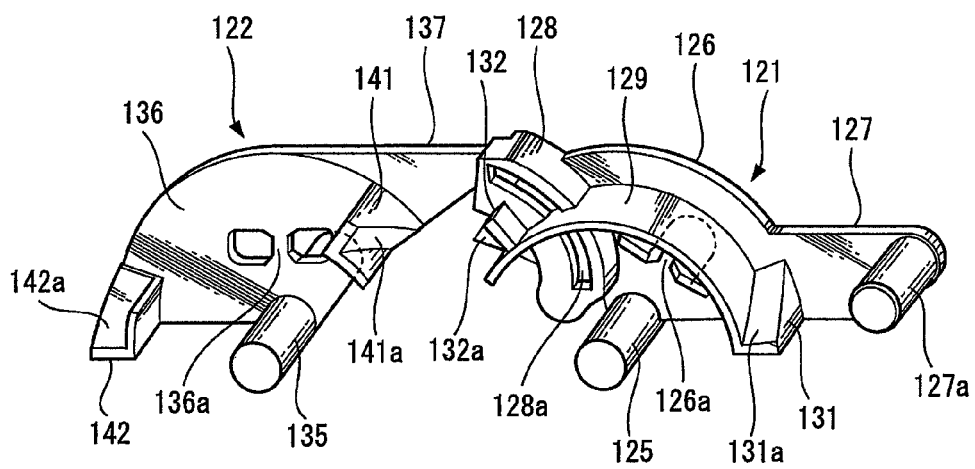
FIG. 27 is a view describing an example of a stopper member of a stopper advancing/retracting mechanism of a disk recording/reproducing apparatus according to a disk recording and/or reproducing apparatus according to an embodiment of the present invention.
Figure 28:
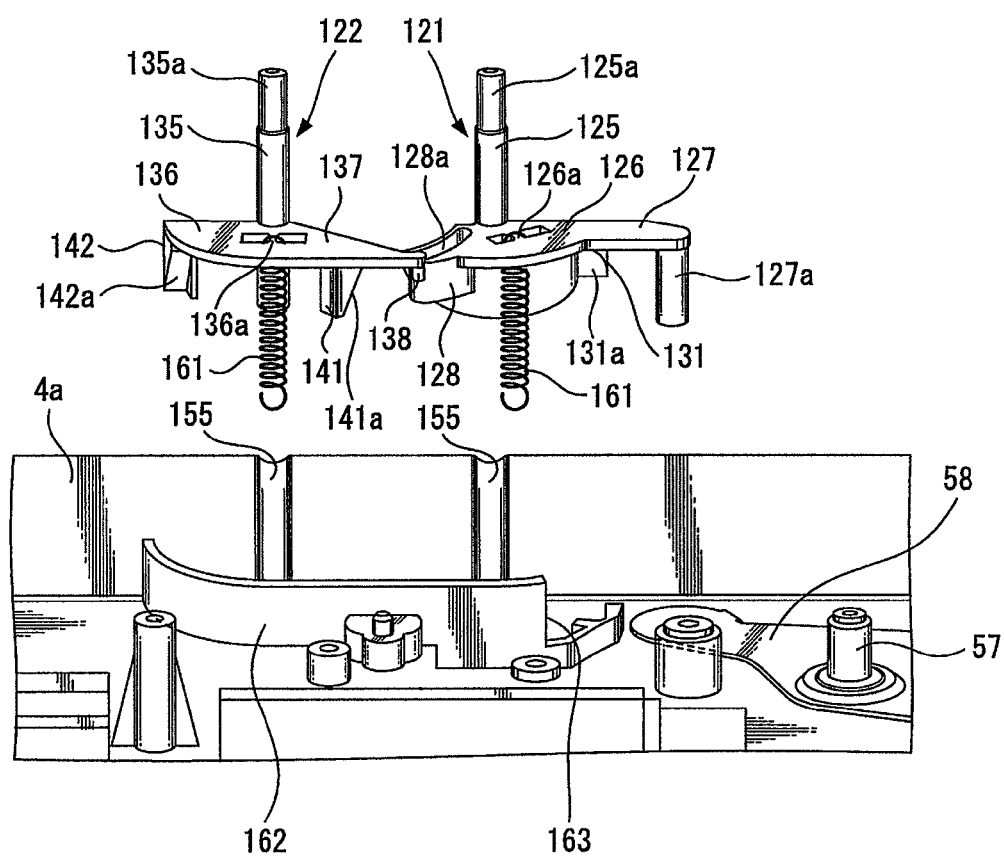
FIG. 28 is a view describing a state where a stopper member is assembled in a stopper advancing/retracting mechanism of a disk recording/reproducing apparatus according to a disk recording and/or reproducing apparatus according to an embodiment of the present invention.
Figure 29:
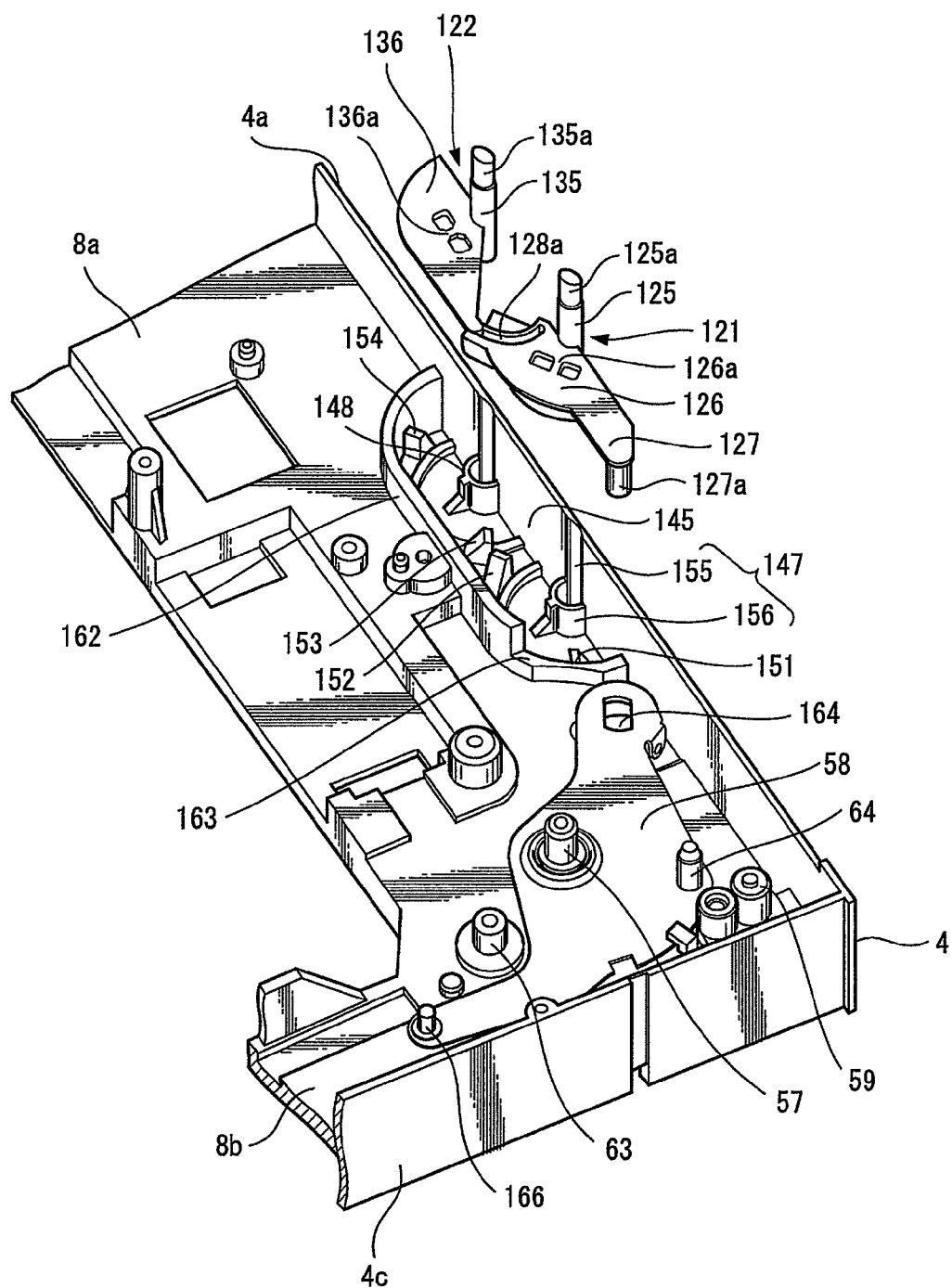
FIG. 29 is another view describing a state where a stopper member is assembled in a stopper advancing/retracting mechanism of a disk recording/reproducing apparatus according to a disk recording and/or reproducing apparatus according to an embodiment of the present invention.
Figure 30:
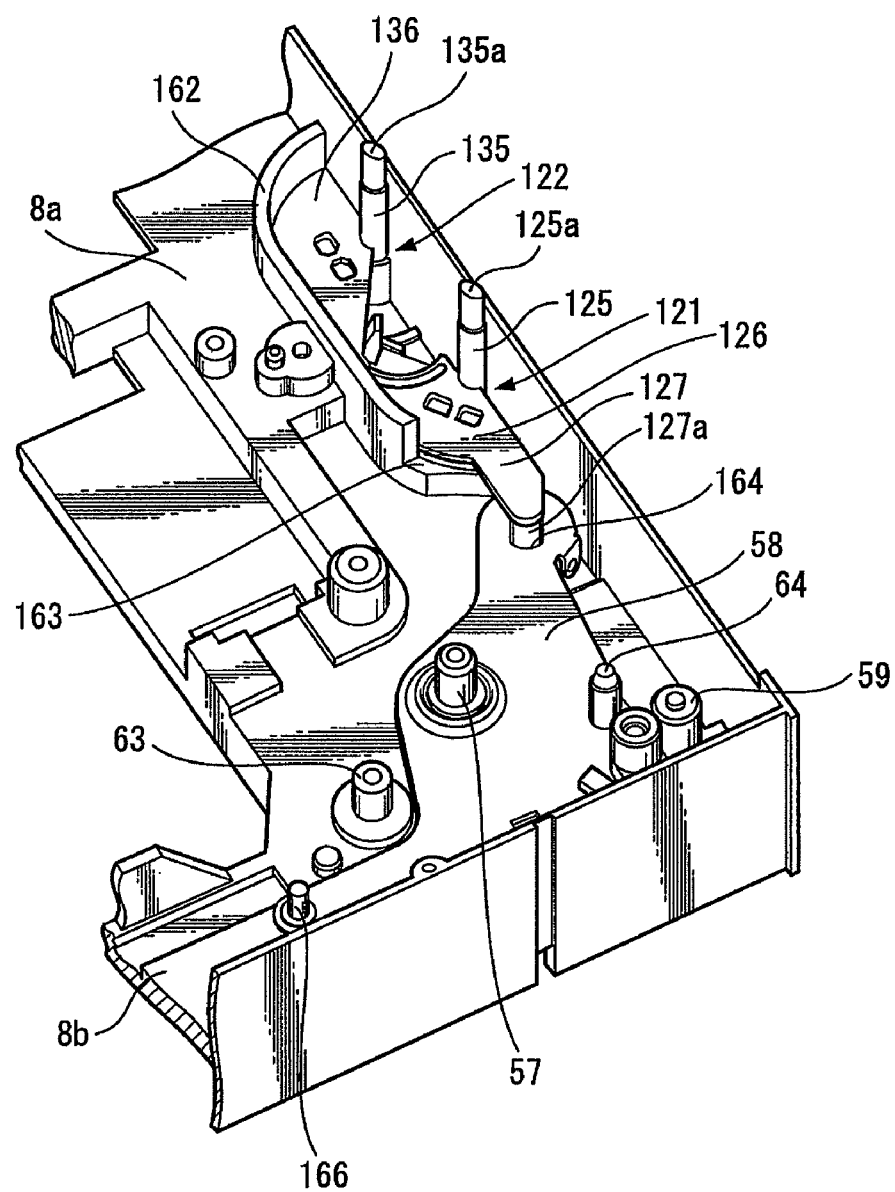
FIG. 30 is a view describing an operation of a stopper advancing/retracting mechanism of a disk recording/reproducing apparatus according to a disk recording and/or reproducing apparatus according to an embodiment of the present invention before protrusion of a stop.
Figure 31:
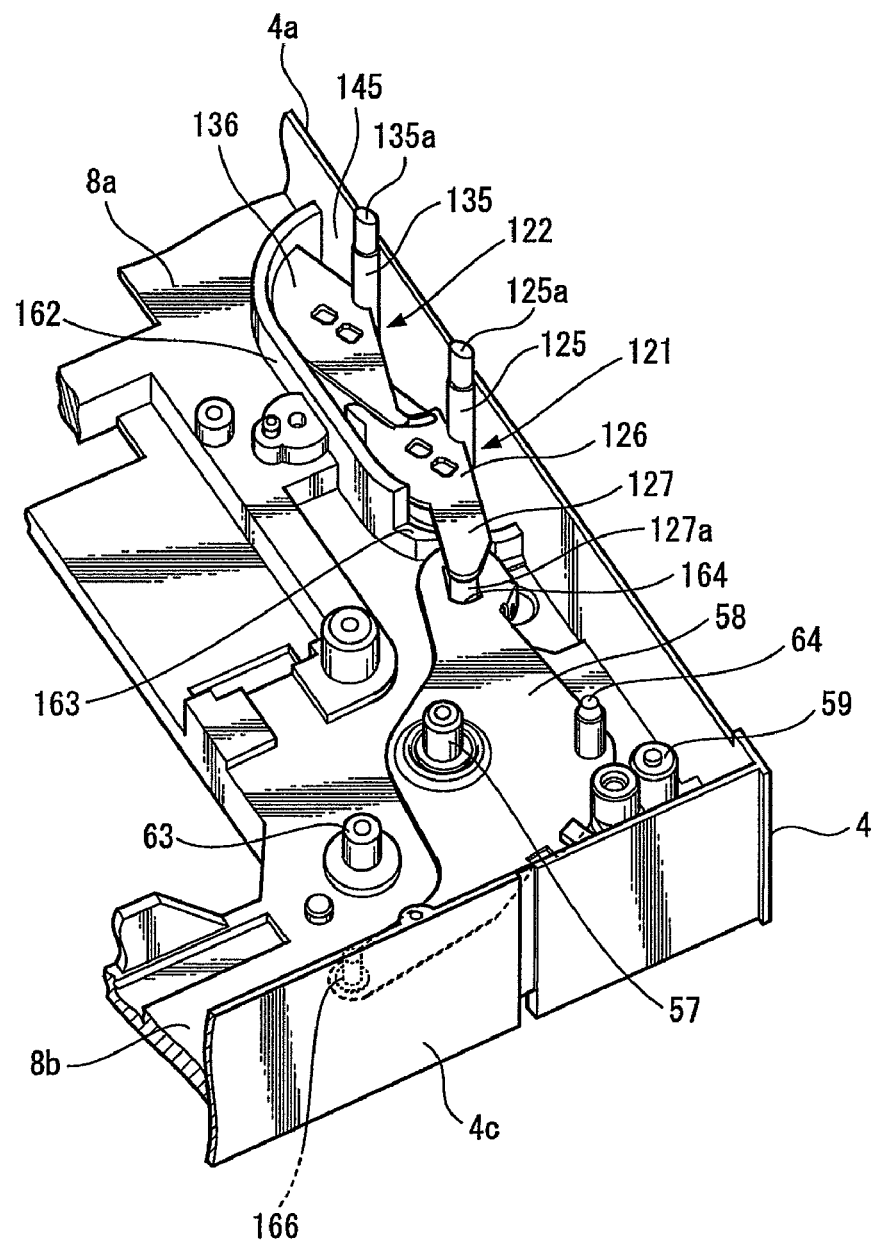
FIG. 31 is a view describing an operation of a stopper advancing/retracting mechanism of a disk recording/reproducing apparatus according to a disk recording and/or reproducing apparatus according to an embodiment of the present invention during protrusion of a stop.

As shown in FIGS. 27 to 29, the first stopper member 121 has a center shaft 125 having a round cross-section, a fan-shaped part 126, an arm 127, a connecting pin 127a, a cam groove 128, a skirt 129, and two first cam projections 131 and 132. The fan-shaped part 126 is provided extending in a fan shape in an axial middle of the center shaft 125. The arm 127 is provided continuously with one circumferential side edge of the fan-shaped part 126 to protrude radially outward. The connecting pin 127a is provided at the top of the arm 127. Further, the cam groove 128 is provided on the other side edge of the fan-shaped part 126. The skirt 129 is provided protruding from a lower surface of the fan-shaped part 126 in a direction identical to that of the connecting pin 127a. The two first cam projections 131 and 132 are provided on both circumferential edges of the skirt 129.

The stopper 125a protruding into the disk entrance 9 to block passage of the optical disk 2 is provided on one axial edge of the center shaft 125 of the first stopper member 121. The connecting pin 127a extends parallel to the center shaft 125 at a predetermined distance therefrom. The cam groove 128 has a cam groove 128a curved in an arc shape around the center shaft 125. The skirt 129 is formed in an arc shape around the center shaft 125, and the one first cam projection 131 is placed on a line connecting the center shaft 125 to the connecting pin 127a. The other first cam projection 132 is placed at a position rotationally displaced circumferentially at about 120° from the first cam projection 131. A circumferentially inclined cam surface 131a or 132a is provided on one circumferential side of each of the two first cam projections 131 and 132.

The second stopper member 122 has a center shaft 135 having a round cross-section, a fan-shaped part 136, an arm 137, an interlocking pin 138, and two second cam projections 141 and 142. The fan-shaped part 136 is provided extending in a fan shape in an axial middle of the center shaft 135. The arm 137 is provided continuously with one circumferential side edge of the fan-shaped part 136 to protrude radially outward. The interlocking pin 138 is provided at the top of the arm 137. The two second cam projections 141 and 142 are provided protruding from a lower surface of the fan-shaped part 136.

The stopper 135a protruding into the disk entrance 9 to block passage of the optical disk 2 in collaboration with the stopper 125a is provided on one axial edge of the center shaft 125 of the second stopper member 122. The interlocking pin 138 extends parallel to the center shaft 135 at a predetermined distance therefrom, and is slidably engaged with the cam groove 128a of the first stopper member 121 when assembled. The one second cam projection 141 is located between the interlocking pin 138 and the center shaft 135 and near a line connecting them to each other. The other second cam projection 142 is placed at a position rotationally displaced circumferentially at about 120° from the second cam projection 141. A circumferentially inclined cam surface 141a or 142a is provided on one circumferential side of each of the two second cam projections 141 and 142.

In this example, a rotating force of the first stopper member 121 is transmitted to the second stopper member 122, and the second stopper member 122 is rotated by rotating the first stopper member 121. Accordingly, the first stopper member 121 and the second stopper member 122 are rotated in relatively reverse directions. Therefore, in this example, the cam surfaces 141a and 142a provided in the second cam projections 141 and 142 of the second stopper member 122 are set circumferentially opposite to the cam surfaces 131a and 132a provided in the first cam projections 131 and 132 of the first stopper member 121. A stopper housing part 145 is provided inside the front surface 4a of the main chassis 4 in order to rotatably and elevatably support the pair of stopper members 121 and 122 having such a configuration.

Figure 26:
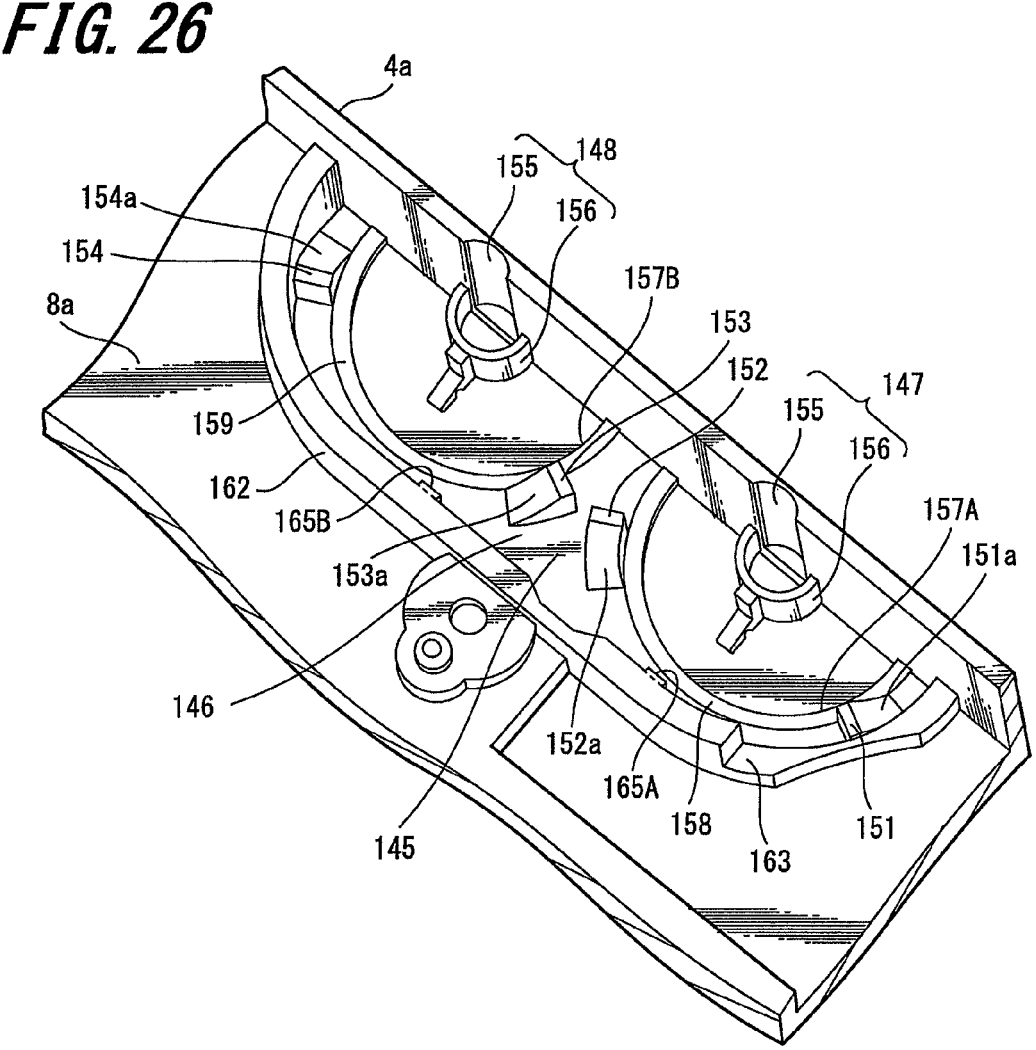
FIG. 26 is a view describing a main part of a main chassis of a disk recording/reproducing apparatus according to a disk recording and/or reproducing apparatus according to an embodiment of the present invention.

The stopper housing part 145 has a configuration as shown in FIG. 26. Specifically, the stopper housing part 145 has a semielliptical fitting recess 146, two bearings 147 and 148, two first cam receiving parts 151 and 152, and two second cam receiving parts 153 and 154. The fitting recess 146 is a recess in which the two stopper members 121 and 122 may be rotatably housed within a predetermined angle range. The two bearings 147 and 148 rotatably support lower parts of the center shafts 125 and 135 of the two stopper members 121 and 122. The two first cam receiving parts 151 and 152 are projections provided corresponding to the two first cam projections 131 and 132 of the first stopper member 121. The two second cam receiving parts 153 and 154 are projections provided corresponding to the two second cam projections 141 and 142 of the second stopper member 122.

The two bearings 147 and 148 are formed by arc-shaped bearing grooves 155 provided in an approximate center in the right-and-left direction on an inner surface of the front surface 4a of the main chassis 4 with a predetermined interval between them in the right-and-left direction, and arc-shaped shaft shackles 156 surrounding lower parts of the bearing grooves 155. Inner peripheries of the bearing grooves 155 and inner peripheries of the shaft shackles 156 are round shapes corresponding in size to outer peripheries of the center shafts 125 and 135, and the center shafts 125 and 135 are supported by them in a thrust direction. The center shafts 125 and 135 are supported by edge surfaces placed below the bearing grooves 155 in a radial direction. The front shelf 8a facing the bearings 147 and 148 has semi-round through-holes 157A and 157B, respectively.

A first sliding support surface 158 slidably supporting the two first cam projections 131 and 132 of the first stopper member 121 is provided on an upper peripheral surface of the first through-hole 157A of the stopper housing part 145. A second sliding support surface 159 slidably supporting the two second cam projections 141 and 142 of the second stopper member 122 is provided on an upper peripheral surface of the second through-hole 157B. In the stopper housing part 145, the two first cam receiving parts 151 and 152 are provided radially outward of the first sliding support surface 158, and the two second cam receiving parts 153 and 154 are provided radially outward of the second sliding support surface 159.

In the first cam receiving parts 151 and 152, their inclined cam surfaces 151a and 152a are provided on sides facing the cam surfaces 131a and 132a of the first cam projections 131 and 132. The cam surfaces 131a and 132a and the cam surfaces 151a and 152a are slidably brought into contact with each other, respectively. Similarly, in the second cam receiving parts 153 and 154, their inclined cam surfaces 153a and 154a are provided on sides facing the cam surfaces 141a and 142a of the second cam projections 141 and 142. The cam surfaces 141a and 142a and the cam surfaces 153a and 154a are also slidably brought into contact with each other, respectively.

FIG. 29 shows a state where the first stopper member 121 is combined with the second stopper member 122. The two stopper members 121 and 122 are housed in a combined state in the stopper housing part 145. Here, each of the stopper members 121 and 122 is always biased by a coil spring 161 (shown in FIG. 28) showing a specific example of an elastic member in a direction to draw the stoppers 125a and 135a from the disk entrance 9. One edge of each of the two coil springs 161 is engaged with a spring receiving piece 156a provided in each of the shaft shackles 156 of the two bearings 147 and 148. The other edge of each of the two coil springs 161 is hooked in each of spring hooking parts 126a and 136a provided in the fan-shaped parts 126 and 136.

Figure 32:
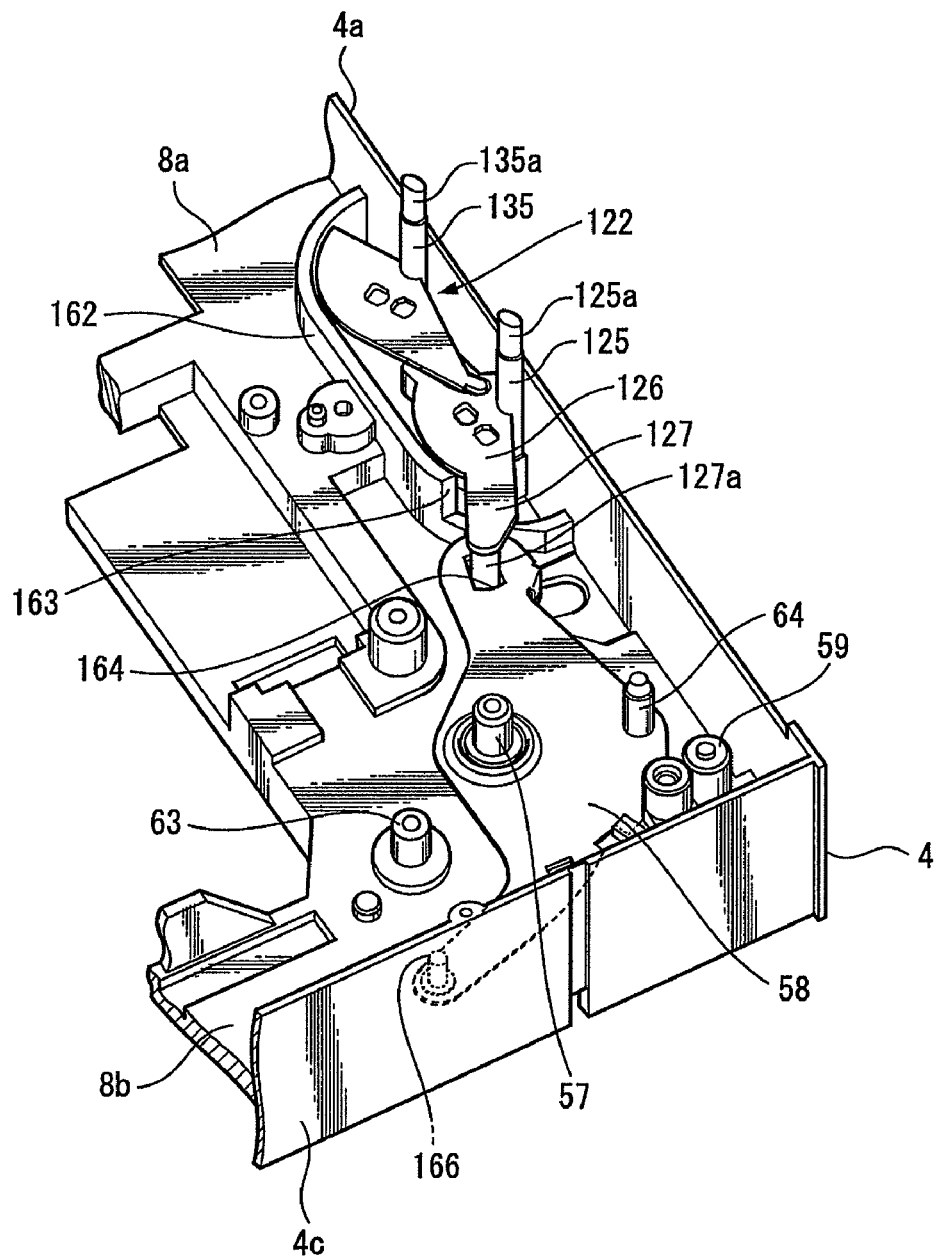
FIG. 32 is a view describing an operation of a stopper advancing/retracting mechanism of a disk recording/reproducing apparatus according to a disk recording and/or reproducing apparatus according to an embodiment of the present invention after protrusion of a stop.

As shown in FIGS. 26 and 32, the stopper housing part 145 is surrounded by a surrounding wall 162. An upper edge of the surrounding wall 162 has a first retaining part 165A preventing the first stopper member 121 from being elevated in a predetermined amount or more, and a second retaining part 165B preventing the second stopper member 122 from being elevated in a predetermined amount or more. The first retaining part 165A protrudes above an outer periphery of the fan-shaped part 126 of the first stopper member 121, and the second retaining part 165B protrudes above an outer periphery of the fan-shaped part 136 of the second stopper member 122. A notch 163 is provided on a side of the surrounding wall 162 facing the first stopper member 121, so that the arm 127 may protrude.

The connecting pin 127a is provided at the top of the arm 127 protruding from the notch 163 of the surrounding wall 162, and is engaged with a long hole 164 of the rocker lever 58 movably within a predetermined range. The rocker lever 58 is rotatably supported by the first support shaft 57 vertically provided on the front shelf 8a, and the pair of stopper members 121 and 122 are rotated by rotating the rocker lever 58. The rocker lever 58 is moved to move the pair of stopper members 121 and 122 up and down and allow the two stoppers 125a and 135a to enter and exit the disk entrance 9.

The rocker lever 58 is formed by a plate-shaped member having an approximately L-shaped plane, and the first support shaft 57 is rotatably fitted in its center. The long hole 164 is provided on one longitudinal edge of the rocker lever 58, and a cam pin 166 is provided on the other longitudinal edge. The cam pin 166 extends to reach the left sliding part 8b, and is slidably engaged with a stopper member operating cam (not shown) provided in the first slide cam member 93. The first slide cam member 93 moves the left sliding part 8b in the back-and-forth direction, so that the rocker lever 58 is rotated in a predetermined amount around the first support shaft 57 through an action of the stopper member operating cam. Accordingly, the pair of stopper members 121 and 122 are moved up and down, and opening/closing of the disk entrance 9 is controlled.

The first slide cam member 93 and the rocker lever 58 form a rotary driving part rotating the two stopper members 121 and 122. The first cam projections 131 and 132, the second cam projections 141 and 142, the first cam receiving parts 151 and 152, and the second cam receiving parts 153 and 154 form an advancing/retracting driving part advancing and retracting the stopper members 121 and 122 in a direction perpendicular to a rotating direction. The rotary driving part and the advancing/retracting driving part form the stopper advancing/retracting mechanism 11 allowing the two stoppers 125a and 135a to enter and exit the disk entrance 9.

In this example, the two stopper members 121 and 122 are used; however, only one stopper member may be used, and three or more stopper members may be used. When one stopper member is used, a disk misinsertion preventing mechanism may be formed by the aforementioned first stopper member 121 and a mechanism to move the first stopper member 121 up and down. When three or more stopper members are used, a disk misinsertion preventing mechanism may be realized using the second stopper member 122 similarly as a third or higher stopper member, in addition to the pair of stopper members 121 and 122 and their elevating mechanism.

Figure 14:
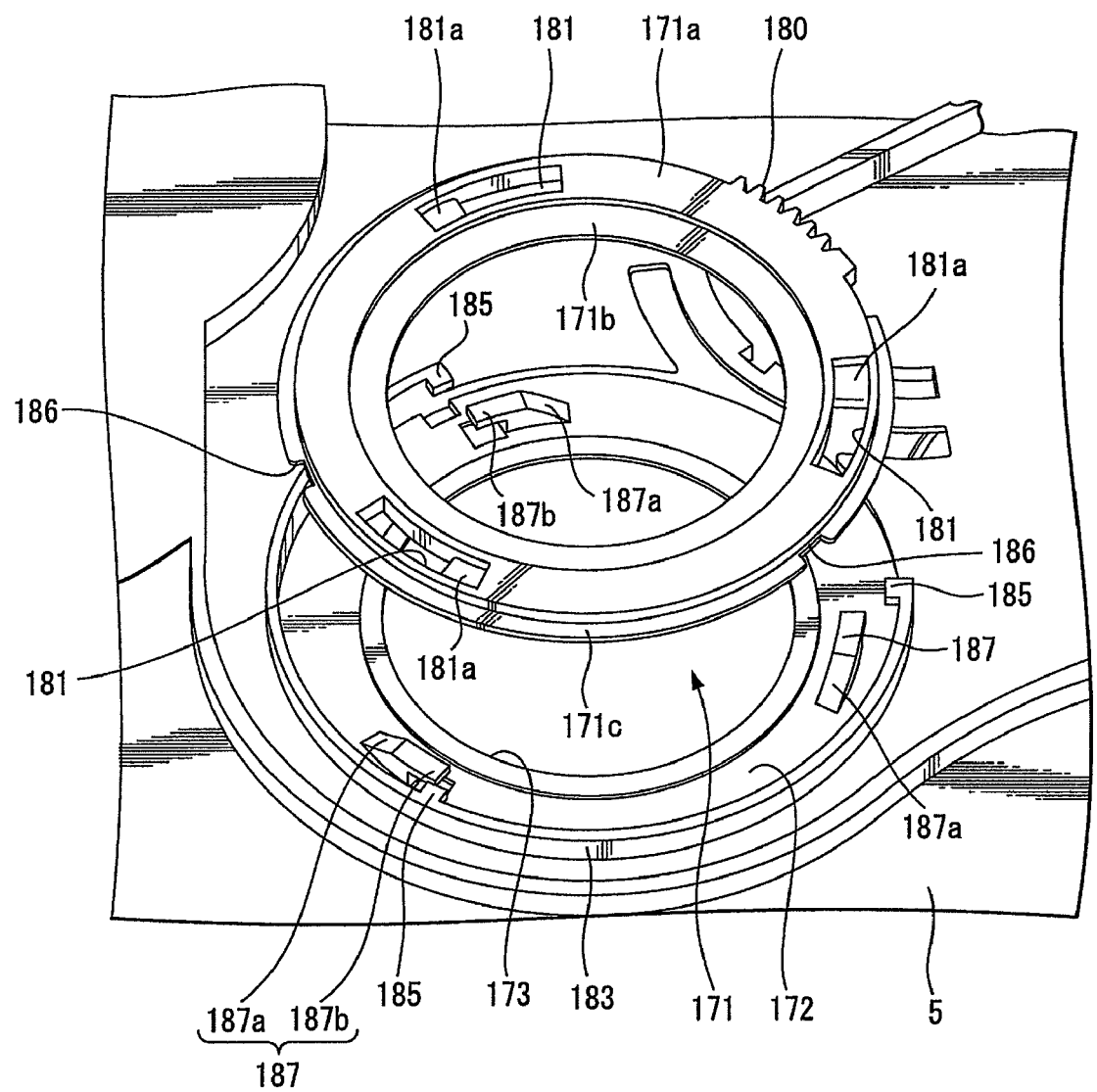
FIG. 14 is a view describing a rotating member and a clamp housing part of a disk recording/reproducing apparatus according to a disk recording and/or reproducing apparatus according to an embodiment of the present invention.

As shown in FIGS. 1 to 4, a clamp member 170 detachably holding the optical disk 2 between the clamp member 170 and the turntable 67 is removably placed in an approximate center of the upper plate 5 covering the upper surface of the main chassis 4 in which the disk drive device 6 is housed. The clamp member 170 is supported by the upper plate 5 as a support member through a rotating member 171, so that the clamp member 170 may be moved up and down heightwise within a predetermined range. The upper plate 5 has a clamp housing part 172 rotatably supporting the rotating member 171. The clamp housing part 172 has a through-hole 173 for penetrating a cylindrical round swelled part 171a (FIG. 14) provided in a center of the clamp member 170.

Figure 15:
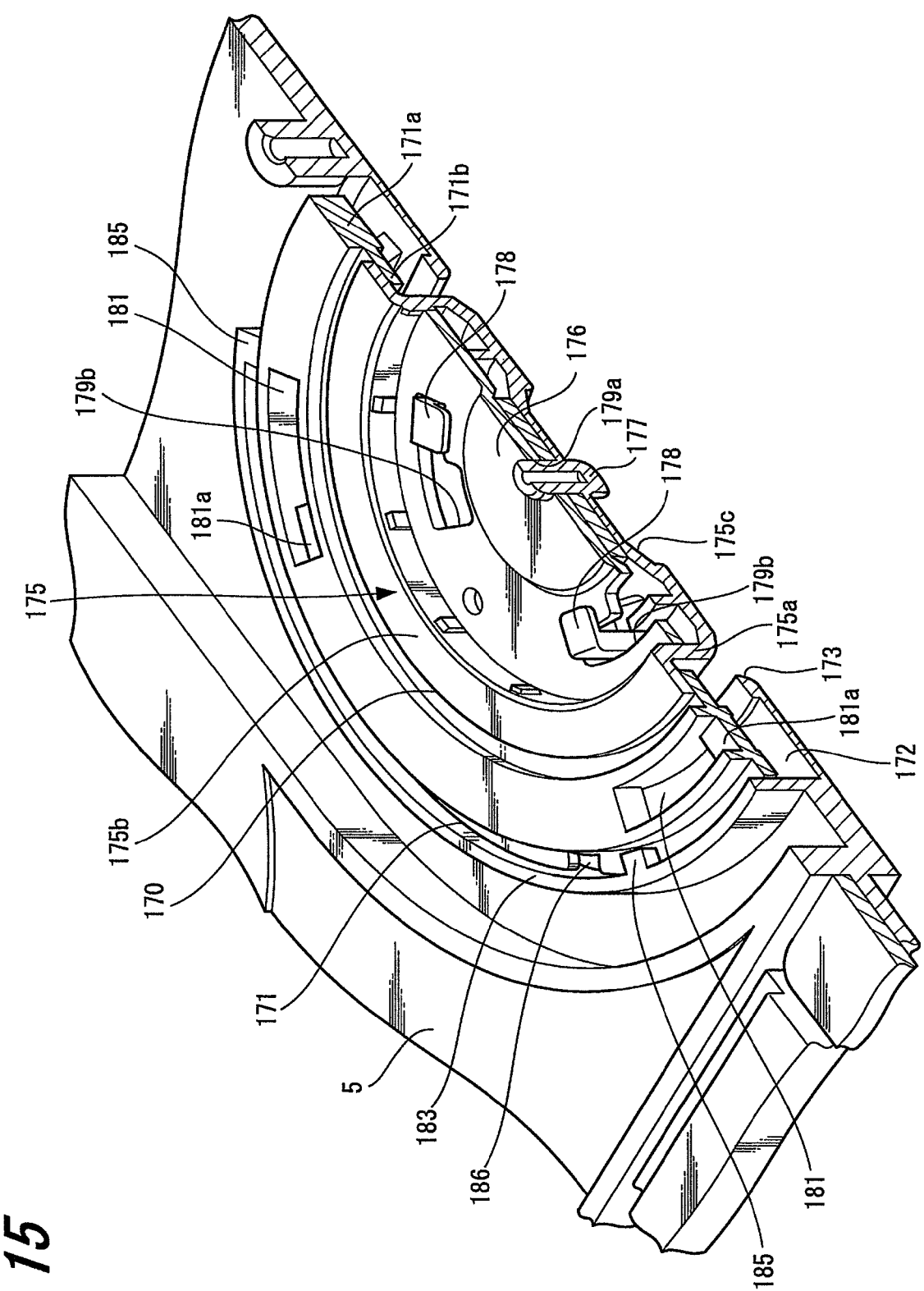
FIG. 15 is a cross-sectional view describing a clamp member, a rotating member and a clamp housing part of a disk recording/reproducing apparatus according to a disk recording and/or reproducing apparatus according to an embodiment of the present invention.

As shown in FIGS. 15, 17A and 17B, the clamp member 170 is formed by a clamp main body 175 having a cylindrical round swelled part 175a in a center, and a yoke member 176 housed in the clamp main body 175. A round outer flange 175b extending radially outward is provided on an opening side of the round swelled part 175a of the clamp main body 175. A chamfer is provided on an outer periphery of the round swelled part 175a. A positioning recess 175c for positioning relative to the fitting part 67b of the turntable 67 is provided radially inward A support shaft 177 to detachably retain the yoke member 176, and a plurality of (three in this example) fixing pieces 178 are provided inside a recess of the round swelled part 175a of the clamp main body 175. The support shaft 177 is vertically provided in an approximate center in the recess, and the plurality of fixing pieces 178 are symmetrically placed around the support shaft 177. In accordance with configurations and shapes of the support shaft 177 and the fixing pieces 178, a center hole 179a is provided in a center of the yoke member 176, and a plurality of attachment holes 179b are provided at predetermined radial positions in the yoke member 176.

The yoke member 176 is fixed to the clamp main body 175 by inserting the support shaft 177 into the center hole 179a, inserting the fixing pieces 178 into the plurality of attachment holes 179b, respectively, and then rotating the yoke member 176 at a predetermined angle. The yoke member 176 may be removed from the clamp main body 175 by rotating the fixed yoke member 176 in a reverse direction. The yoke member 176 attracts the clamp member 170 to the turntable 67 by a magnetic force provided from the magnet 73 and the yoke 74 housed in the fitting part 67b of the turntable 67. As a material for the yoke member 176, it is possible to use not only an iron plate, a steel plate or another magnetic body, obviously, but also a magnet.

As shown in FIGS. 14 to 17, the rotating member 171 is formed by a ring-shaped member slightly larger than the clamp member 170. The rotating member 171 has a ring main body 171a having an inner diameter larger than an outer diameter of the outer flange 175b of the clamp member 170, an inner flange 171b, an outer flange 171c and a gear 180. The inner flange 171b extends radially inward of the ring main body 171a, and the outer flange 171c extends radially outward of the ring main body 171a. The gear 180 is provided in a part radially outward of the ring main body 171a.

The ring main body 171a of the rotating member 171 has three arc-shaped cam holes 181. The three cam holes 181 are placed with equal angle intervals between them along a circumference of the ring main body 171a. One side of each of the cam holes 181 has a step 181a for locking the rotating member 171 using a cam projection 182 described later. The inner flange 171b of the rotating member 171 is formed to have an inner diameter larger than an outer diameter of the round swelled part 175a of the clamp main body 175 but smaller than the outer diameter of the outer flange 175b. The inner flange 171b of the rotating member 171 supports the outer flange 175b of the clamp member 170.

The outer flange 171c of the rotating member 171 prevents the rotating member 171 from being detached from the clamp housing part 172. Accordingly, retainer pawls 185 protruding radially inward are provided in three places on a surrounding wall 183 surrounding the clamp housing part 172. The three retainer pawls 185 are placed with equal intervals between them, and notches corresponding to them are provided in the outer flange 171c of the rotating member 171.

Three cam projections 187 are provided at corresponding positions in the clamp housing part 172 in accordance with this structure of the rotating member 171. The three cam projections 187 are placed concentrically with the three cam holes 181 with equal angle intervals between them. Each of the cam projections 187 has an inclined surface 187a inclined on one circumferential side and a canopy 187b protruding on the other circumferential side.

When the three cam projections 187 completely enter the three cam holes 181 by rotating the rotating member 171 in one direction, as shown n FIG. 17B, the rotating member 171 is at the lowest position. The rotating member 171 is locked to the upper plate 5 when the canopies 187b of the cam projections 187 run on and are engaged with the steps 181a of the cam holes 181. In this state, the clamp member 170 is attracted to the turntable 67, and the optical disk 2 is held by the clamp member 170 and the turntable 67.

In contrast, when the rotating member 171 is rotated in one direction, the rotating member 171 is guided and pushed upward by each of the inclined surfaces 187a of the three cam projections 187. The rotating member 171 is at the highest position as shown in FIG. 17A when it completely overcomes the three cam projections 187. In this state, the clamp member 170 is completely detached from the turntable 67, and a holding state of the optical disk 2 is released.

A drive lever 190 is rotatably attached to an upper surface of the upper plate 5 to automatically rotate the rotating member 171. The drive lever 190 is formed by a lever member having an angular plane with one longitudinal edge fan-shaped. A gear 191 is provided at the top of the edge. An operating pin 192 is provided on the other longitudinal edge of the drive lever 190. The drive lever 190 having such a configuration is rotatably fixed to the upper plate 5 by a fixing screw 193, with the gear 191 meshed with the gear 180 of the rotating member 171. Here, the operating pin 192 penetrates an arch-shaped long hole 194 provided in the upper plate 5 and enters the enclosure 3. The operating pin 192 is engaged with the lever support 105 provided in the second slide cam member 94.

The rotating member 171, the cam projections 187 provided in the upper plate 5, and the drive lever 190 form a rotary elevating mechanism moving the rotating member 171 up and down at a predetermined height by rotating the rotating member 171. In this example, the three cam projections 187 and the three cam holes 181 are provided with equal intervals between them, because such a configuration is horizontally well-balanced to move the rotating member 171 up and down while maintaining it in a horizontal state. However, the four or more cam projections 187 and the four or more cam holes 181 may be provided, and the two cam projections and the two cam holes may be placed at symmetrical positions. Contrary to this example, a cam projection may be provided in a rotating member, and a cam hole or a cam groove corresponding to the cam projection may be provided in an upper plate 5 or an alternative member.

Figure 16A:
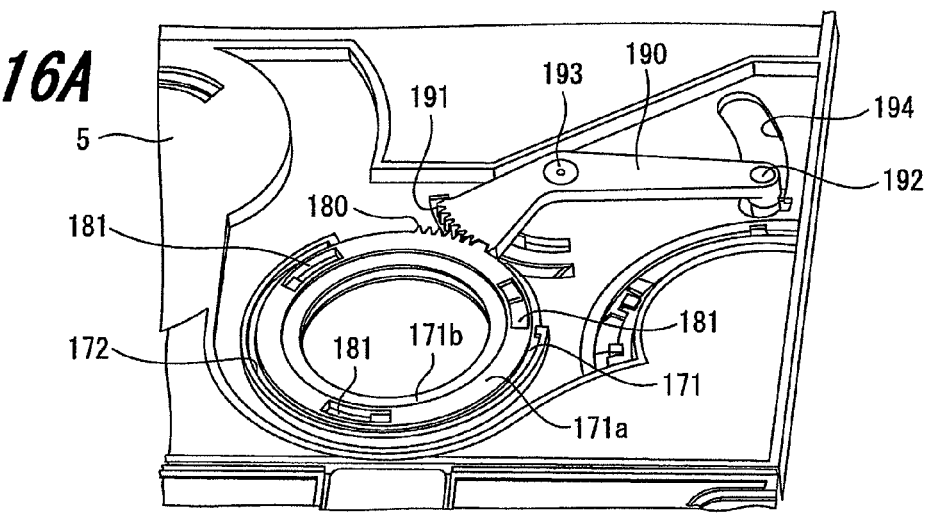
FIG. 16A is a view describing a state where a rotating member is in an uppermost part.
Figure 16B:
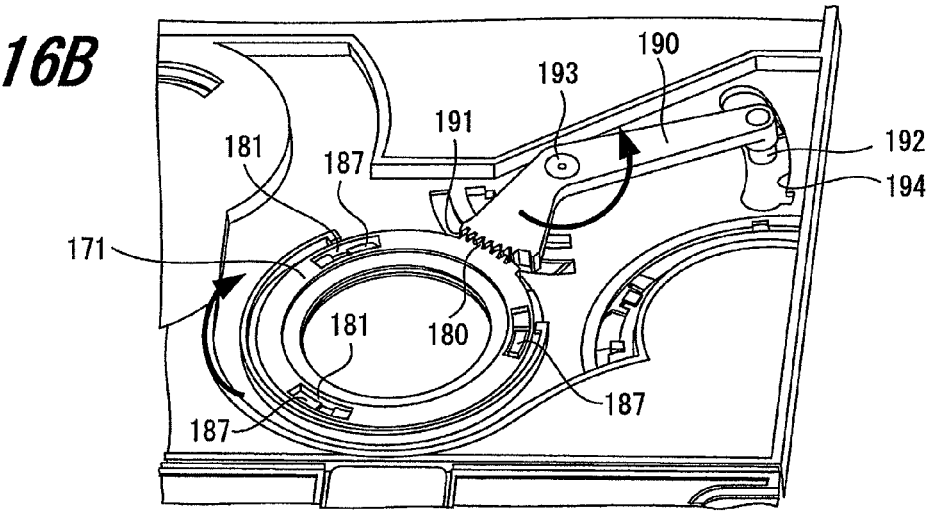
FIG. 16B is a view describing a state where a rotating member is in a middle part.
Figure 16C:
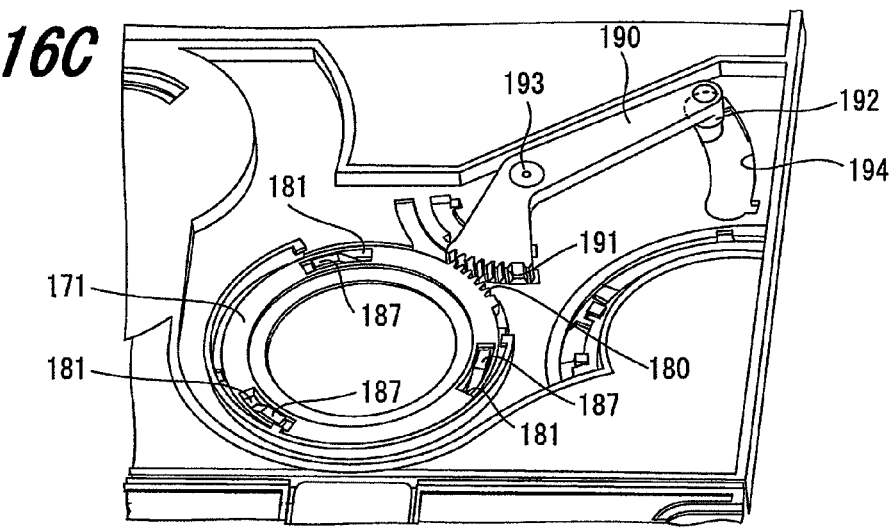
FIG. 16C is a view describing a state where a rotating member is in a lowermost part.

FIGS. 16A to 16C are views describing an operation of the rotary elevating mechanism. FIG. 16A shows a state where the rotating member 171 is raised upward by the rotary elevating mechanism. In this state, the three cam projections 187 are at positions displaced from the three cam holes 181, and a front edge of the gear 191 of the drive lever 190 is meshed with the gear 180 of the rotating member 171. Here, the clamp member 170 is sufficiently separated from the turntable 67 and supported by the rotating member 171.

FIG. 16B shows a state where the optical disk 2 is transferred a certain distance, and the drive lever 190 is slightly rotated by being pressed by contact of an outer periphery of the optical disk 2 with the operating pin 192. The rotating member 171 is rotated by rotating the drive lever 190 according to an amount of rotation of the drive lever 190. As a result, the cam projections 187 enter the respective cam holes from below the inclined surface 187a, and the rotating member 171 is raised. The optical disk 2 is then transferred to the disk mounting part at a predetermined position and put in a state shown in FIG. 16C.

FIG. 16C shows a state where the rotating member 171 is moved to the lowest position. In this state, the three cam projections 187 completely enter the three cam holes 181, and the canopies 187b of the cam projections 187 are engaged with the steps 181a of the cam holes 181. Accordingly, the rotating member 171 is locked to the clamp housing part 172 of the upper plate 5.

Figure 2:
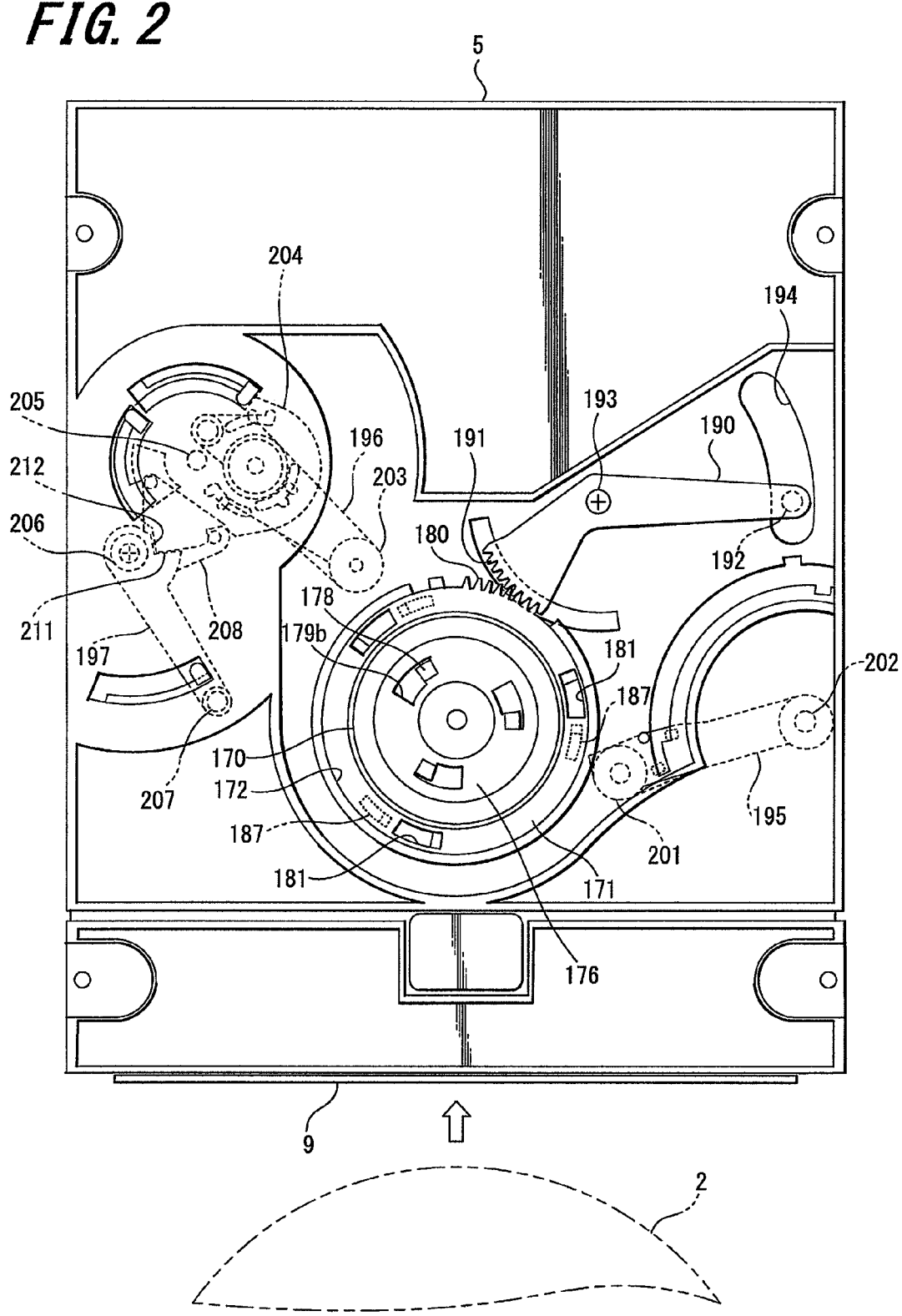
FIG. 2 is a plan view showing an example of a disk recording/reproducing apparatus according to a disk recording and/or reproducing apparatus according to an embodiment of the present invention before insertion of a disk-shaped recording medium.
Figure 3:
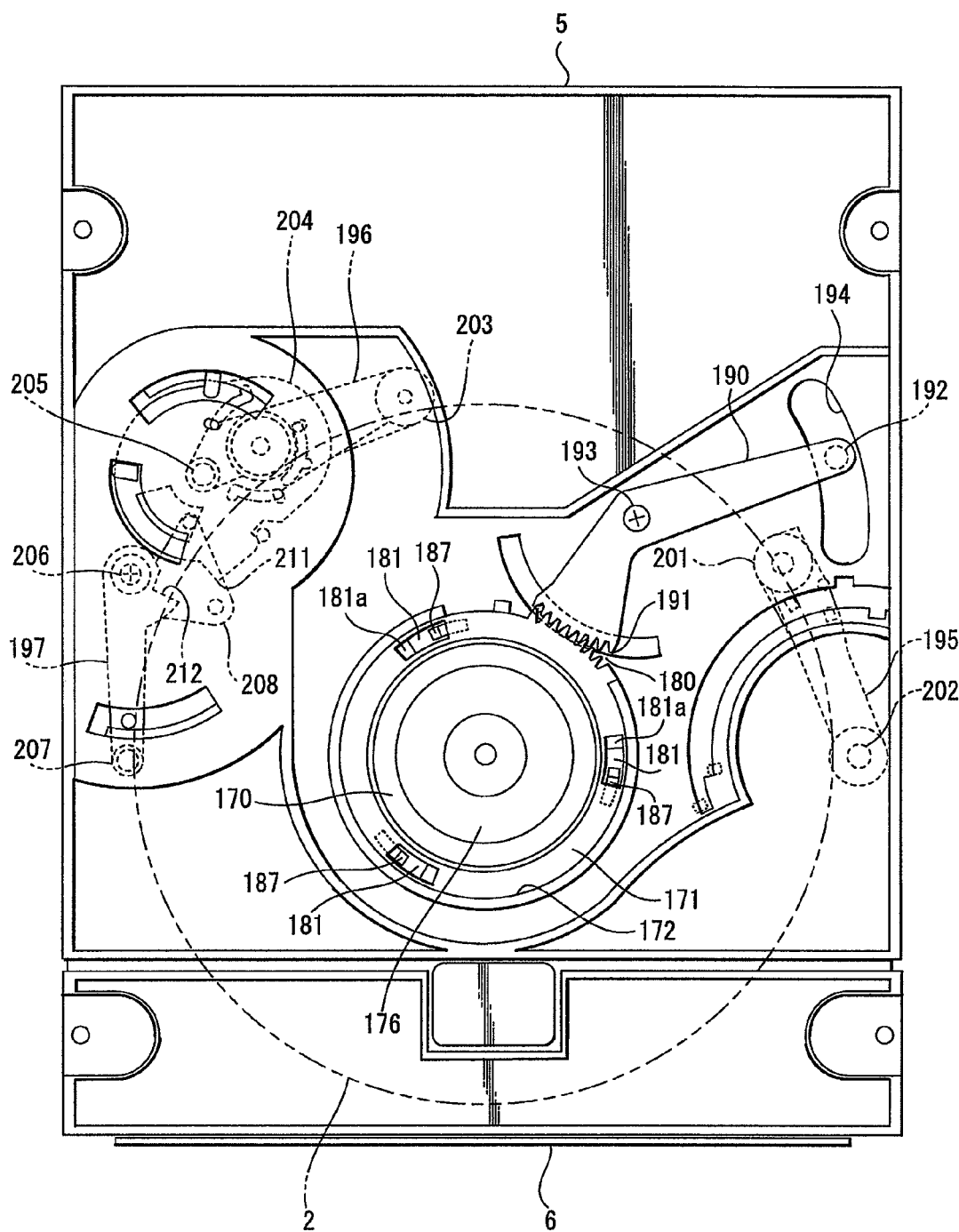
FIG. 3 is a plan view showing an example of a disk recording/reproducing apparatus according to a disk recording and/or reproducing apparatus according to an embodiment of the present invention during insertion of a disk-shaped recording medium.
Figure 4:
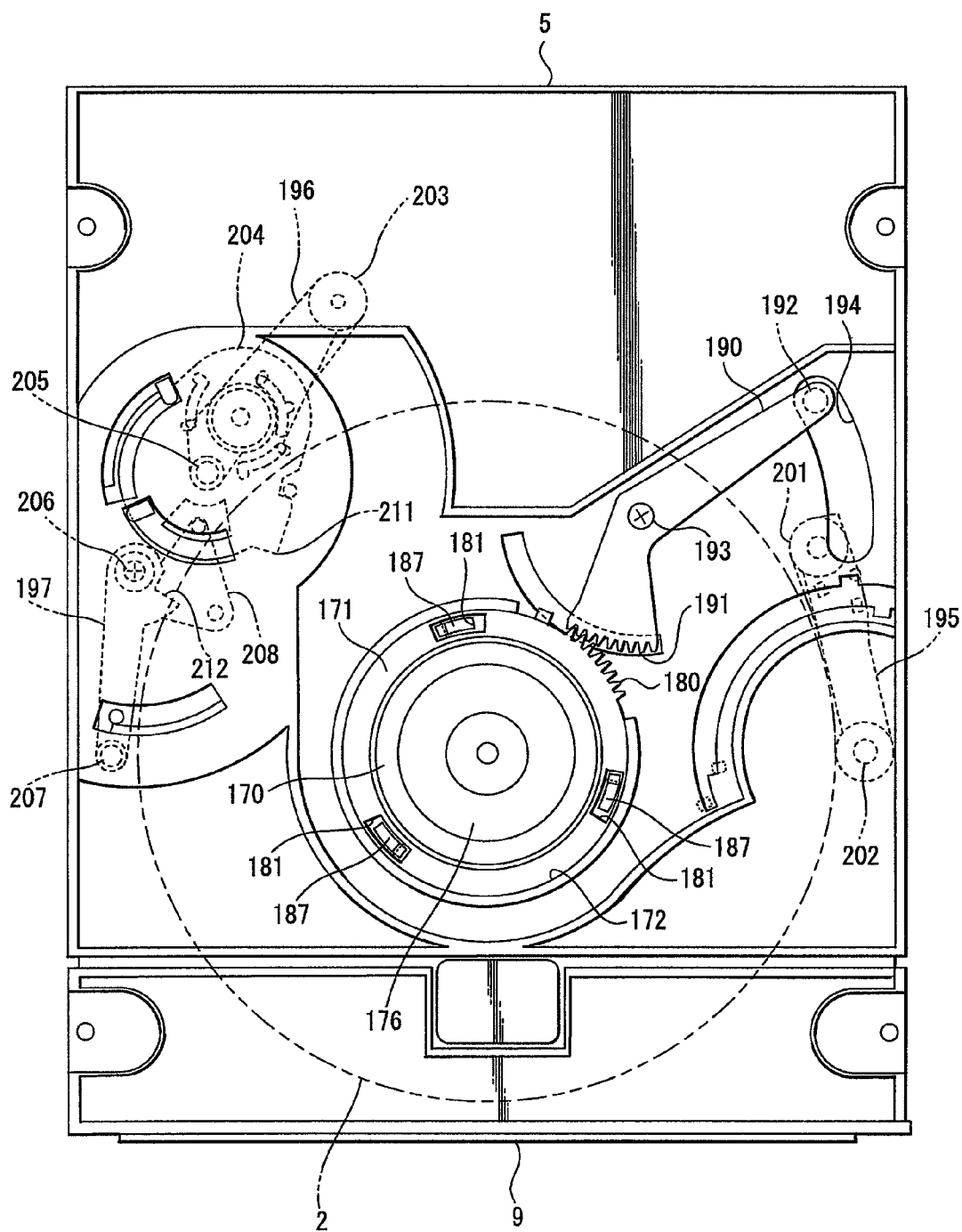
FIG. 4 is a plan view showing an example of a disk recording/reproducing apparatus according to a disk recording and/or reproducing apparatus according to an embodiment of the present invention after insertion of a disk-shaped recording medium.

As shown in FIGS. 2 to 4, a first transfer support arm 195, a second transfer support arm 196 and an actuating arm 197 are attached to an inner surface of the upper plate 5, where the first transfer support arm 195 and the second transfer support arm 196 transfer the optical disk 2 in collaboration with the disk transfer mechanism 7, and the actuating arm 197 actuates the second transfer support arm 196. The two transfer support arms 196 and 197 and the actuating arm 197 are placed surrounding the clamp member 170. In this example, the first transfer support arm 195 is placed to the right of the clamp member 170, the second transfer support arm 196 is placed to the left of and behind the clamp member 170, and the actuating arm 197 is placed to the left of the clamp member 170. The drive lever 190 is placed to the right of and behind the clamp member 170.

The first transfer support arm 195 has one edge having a disk receiving part 201 and the other edge rotatably supported by the upper plate 5 through a first support shaft 202. The first transfer support arm 195 is biased by a spring member (not shown) in a direction in which the disk receiving part 201 approaches the clamp member 170. FIG. 2 shows an initial position of the first transfer support arm 195, which is sequentially rotated clockwise according to an insertion state of the optical disk 2. FIG. 3 shows a state where the optical disk 2 is transferred to the disk mounting part, and the disk receiving part 201 supports a part of the outer periphery of the optical disk 2 until this state is reached. In recording and reproduction thereafter, the first transfer support arm 195 is moved away from the optical disk 2 and radially outward and its waiting state is maintained, as shown in FIG. 4.

The second transfer support arm 196 has one edge having a disk receiving part 203 and the other edge supported by a rotating plate 204 rotatably within a predetermined range. The rotating plate 204 is rotatably supported by the upper plate 5 through a second support shaft 205. One edge of the actuating arm 197 is rotatably supported by the upper plate 5 through an attachment screw 206 near the rotating plate 204. The other edge of the actuating arm 197 has an input pin 9 that is pressed by contact with the transferred optical disk 2. The one edge of the actuating arm 197 has a connecting part 208 and is connected to the rotating plate 204 by the connecting part 208 relatively rotatably within a predetermined range.

The rotating plate 204 is biased by a spring member (not shown) in a direction in which the disk receiving part 203 approaches the clamp member 170. The actuating arm 197 is also biased by a spring member (not shown) in a direction in which the input pin 207 approaches the clamp member 170. The rotating plate 204 and the actuating arm 107 have ratchets engaged with each other to limit rotation of these members each other. The ratchet is formed by a combination of a projection 211 and a receiving part 212, where the projection 211 is provided in the rotating plate 204 and the receiving part 212 is provided in the actuating arm 197.

FIG. 2 shows an initial position of the second transfer support arm 196. The second transfer support arm 196 is sequentially rotated counterclockwise according to an insertion state of the optical disk 2. FIG. 3 shows a state where the optical disk 2 is transferred to the disk mounting part, and the disk receiving part 203 of the second transfer support arm 196 supports a part of the outer periphery of the optical disk 2 until this state is reached. In recording and reproduction thereafter, the second transfer support arm 196 is moved away from the optical disk 2 and radially outward and its waiting state is maintained, as shown in FIG. 4.

Similarly, FIG. 2 shows an initial position of the actuating lever 197. The actuating lever 197 is sequentially rotated clockwise according to an insertion state of the optical disk 2, and the second transfer support arm 196 is rotated by rotating the actuating lever 197. FIG. 3 shows a state where the optical disk 2 is transferred to the disk mounting part. When the actuating lever 197 is moved until this state is reached, the second transfer support arm 196 is changed to a state shown in the same figure. In recording and reproduction thereafter, the actuating lever 197 is moved away from the optical disk 2, so that the second transfer support arm 196 is moved radially outward to be in a state shown in the same figure and its waiting state is maintained, as shown in FIG. 4.

Figure 12A:
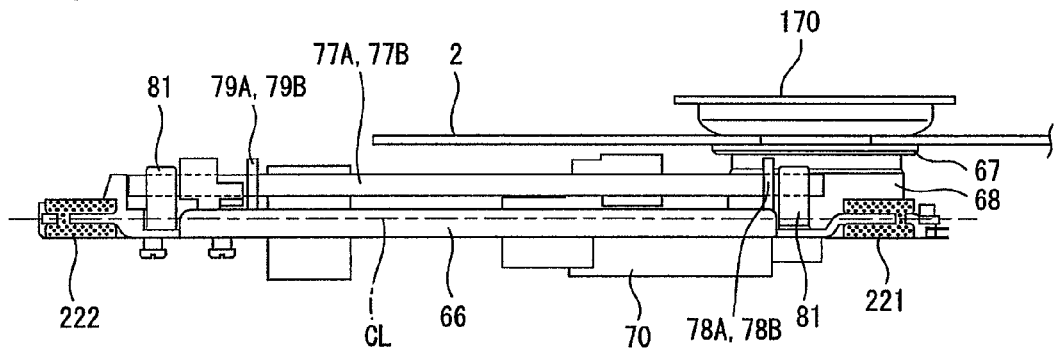
FIG. 12A is a view describing an attitude at the time of chucking.
Figure 12B:
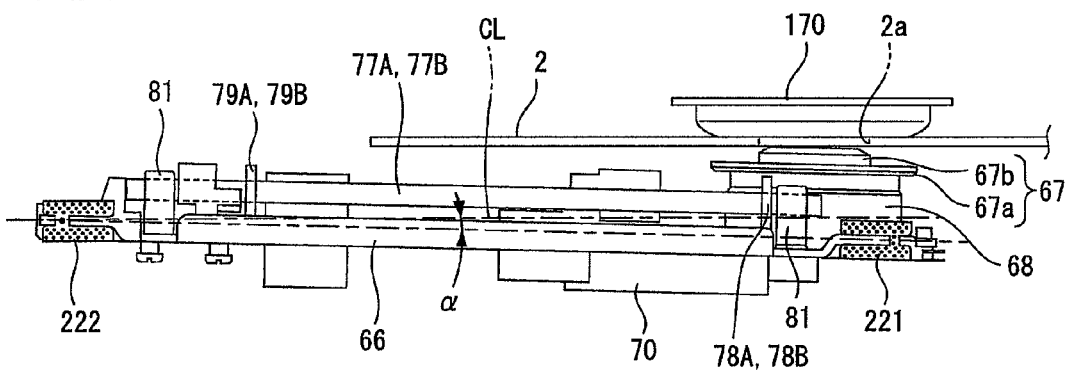
FIG. 12B is a view describing an attitude at the time of release of chucking.
Figure 12C:
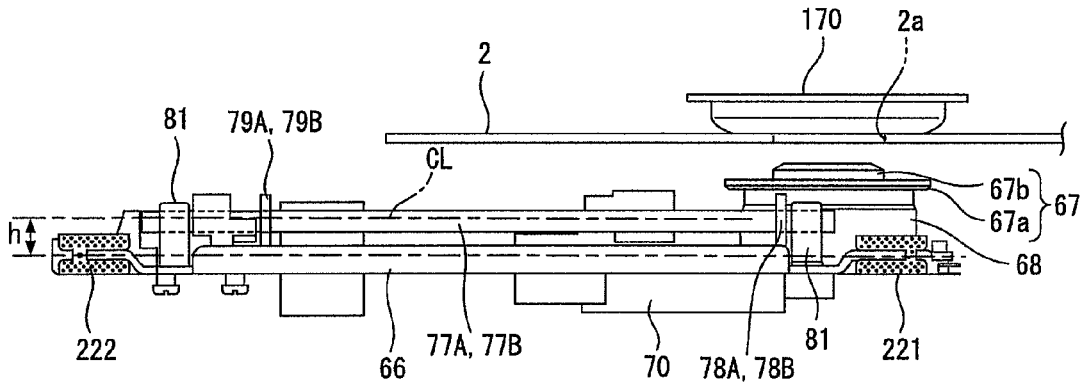
FIG. 12C is a view describing an attitude after movement.

FIGS. 12A to 12C show a first example describing an operation of stripping the turntable 67 from the clamp member 170. In a stripping mechanism shown as the first example, a front side of the drive holder 66 facing the turntable 67 in a state shown in FIG. 12A is first pulled down (angle α), and the turntable 67 is stripped from the clamp member 170 (state in FIG. 12B). Then, a rear side of the drive holder 67 opposite to the turntable 67 is pulled down, and the disk drive device 6 is changed to a horizontal state (state in FIG. 12C). The reference numeral 220 denotes a mount insulator for resiliently supporting the drive holder 66 relative to the main chassis 4.

In the state of FIG. 12A, the optical disk 2 is maintained in a horizontal state (CL) by the disk transfer mechanism 10 and the two transfer support arms 195 and 196. The pair of slide cam members 93 and 94 in this state are moved in the back-and-forth direction to push down the front side of the drive holder 66 and make an attitude of the disk drive device 6 inclined downward toward the front. Accordingly, the clamp member 170 is stripped from the turntable 67 and the optical disk 2 not by a force acting immediately from above but by a force acting obliquely. This makes it possible to reduce a load when the turntable 67 is stripped from the clamp member 170 against an attraction force by which the magnet 73 incorporated in the turntable 67 and the yoke 176 retained in the clamp member 170 are attracted to each other. At the same time, an operation sound when stripping may be reduced.

Figure 13A:
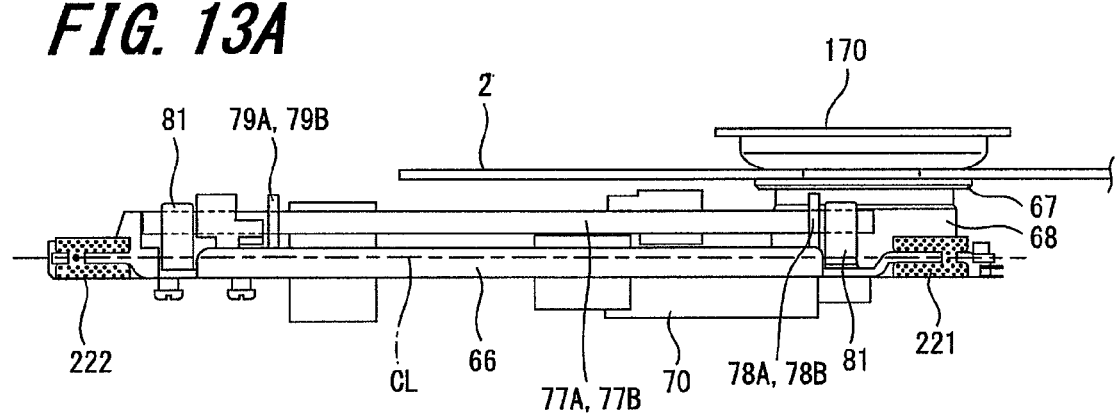
FIG. 13A is a view describing an attitude at the time of chucking.
Figure 13B:
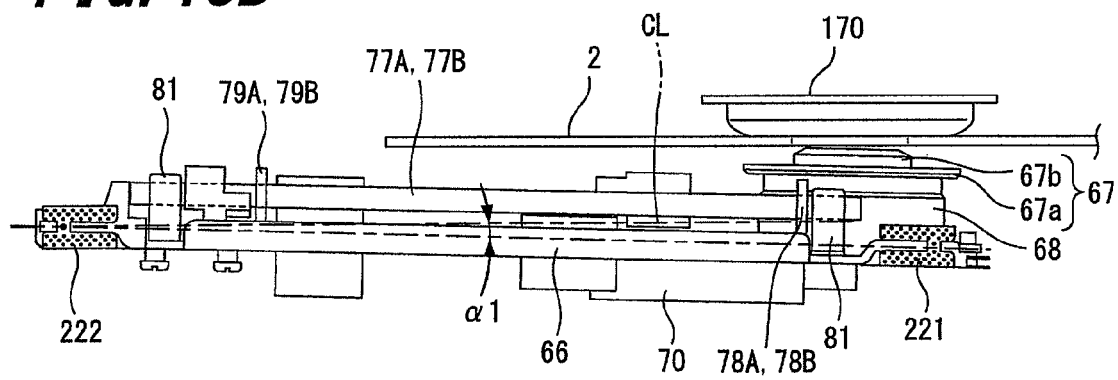
FIG. 13B is a view describing an attitude at the time of release of chucking.
Figure 13C:
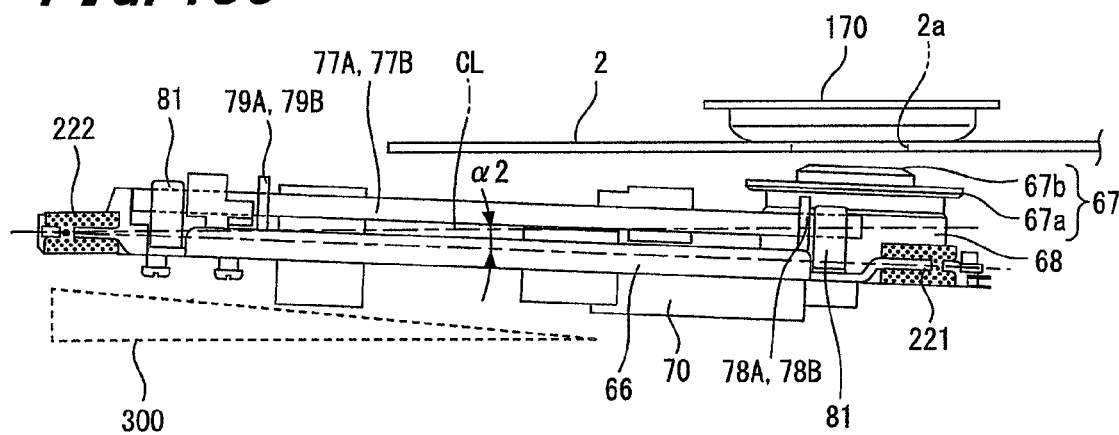
FIG. 13C is a view describing an attitude after movement.

FIGS. 13A to 13C show a second example describing an operation of stripping the turntable 67 from the clamp member 170. In a stripping mechanism shown as the second example, the front side of the drive holder 66 facing the turntable 67 in a state shown in FIG. 13A is first pulled down (angle α1), and the turntable 67 is stripped from the clamp member 170 (state in FIG. 13B). Then, the front side was further pulled down (angle α2) without returning to a horizontal state (CL). Here, the rear side of the drive holder 66 is maintained at an approximately equal height and only the front side is continuously lowered, so that the disk drive device 6 is changed to an inclined state (state of FIG. 13C).

In the state of FIG. 13A, the optical disk 2 is similarly maintained in a horizontal state (CL) by the disk transfer mechanism 10 and the two transfer support arms 195 and 196. The pair of slide cam members 93 and 94 in this state are moved in the back-and-forth direction to push down the front side of the drive holder 66 and make an attitude of the disk drive device 6 inclined downward toward the front. Accordingly, the clamp member 170 is stripped from the turntable 67 and the optical disk 2 not by a force acting immediately from above but by a force acting obliquely.

This makes it possible to reduce a load when the turntable 67 is stripped from the clamp member 170 against an attraction force by which the magnet 73 incorporated in the turntable 67 and the yoke 176 retained in the clamp member 170 are attracted to each other. Moreover, an operation sound when stripping may be reduced. Further, in this example, a vacant space denoted by the reference numeral 300 is formed on a rear side of the disk drive device 6. Therefore, the whole apparatus may be made compact by not occupying the vacant space 300.

The disk recording/reproducing apparatus 1 having the aforementioned configuration may be assembled as follows, for example. First, the stopper advancing/retracting mechanism 11 is assembled to the front shelf 8a of the main chassis 4. Then, the disk drive device 6 is placed in the opening 65 of the main chassis 4, the first slide cam member 93 is assembled to the left sliding part 8b, and the second slide cam member 94 is assembled to the right sliding part 8c. Then, the first cam pins 91A and 91B of the disk drive device 6 are engaged with the first cams 99A and 99B of the first slide cam member 93. Simultaneously with or before or after this operation, the second cam pins 92A and 92B of the disk drive device 6 are engaged with the second cams 107A and 107B of the second slide cam member 94.

Then, the interlocking link 111 is attached to the upper plate 5, the connecting pin 113A on one edge is engaged with the first connecting support 96 of the first slide cam member 93, and the connecting pin 113B on the other edge is engaged with the second connecting support 104 of the second slide cam member 94. Then, the disk transfer mechanism 10 is assembled to a front part of the main chassis 4. Then, the upper plate 5 having the transfer support arms 195 and 196, the drive lever 190 and the actuating arm 197 previously assembled thereto is assembled to the main chassis 4.

The disk recording/reproducing apparatus 1 is operated as follows, for example. As shown in FIG. 2, the optical disk 2 is inserted into the disk entrance 9 of the enclosure 3 and ejected from the disk entrance 9. A predetermined position in the enclosure 3 to which the optical disk 2 is transferred by the disk transfer mechanism 10 or the like is the disk mounting part, for example, the turntable 67. The optical disk 2 is transferred to an ejection side by the disk transfer mechanism 10 or the like, and protrudes in a predetermined amount and may be taken out from the disk entrance 9. Such a position is the disk ejection part.

When the optical disk 2 in the state shown in FIG. 2 is inserted into the enclosure 3, the disk transfer mechanism 10 is operated interlockingly with the insertion to transfer the optical disk 2 to the disk mounting part. Here, the second slide cam member 94 is moved rearward by a force by which the optical disk 2 is transferred. The moving force is transmitted to the first slide cam member 93 through the interlocking link 111 to move the first slide cam member 93 forward. Accordingly, a front side of the disk drive device 6 is raised by movement of the second cams 107A and 107B in accordance with movement of the second slide cam member 94 rearward and movement of the first cams 99A and 99B in accordance with movement of the first slide cam member 93 forward. Accordingly, the front side of the disk drive device 6 initially maintained to be inclined downward toward the front is raised, so that the disk drive device 6 is changed to an approximately horizontal state.

As a result, the optical disk 2 is held between the turntable 67 and the clamp member 170 through the aforementioned operation described with reference to FIGS. 12 and 13. Here, the clamp member 170 supported by the rotating member 171 is gradually lowered by lowering the rotating member 171 to a lower edge by rotation through the drive lever 190. This makes it possible to prevent the clamp member 170 from being rapidly attracted by a magnetic force of the magnet 73 and to prevent collision of the clamp member 170 with the optical disk 2 and the turntable 67 with an impulsive sound. Thus, an information signal may be recorded (written) on and/or reproduced (read) from the optical disk 2.

When the optical disk 2 is mounted on the disk mounting part simultaneously with or before or after this operation, the respective stoppers 125a and 135a of the two stopper members 125 and 135 protrude into the disk entrance 9 by actuation of the stopper advancing/retracting mechanism 11. Accordingly, an approximate center of the disk entrance 9 is closed by the two stoppers 125a and 135a, and insertion of the second optical disk 2 is blocked. This makes it possible to prevent a misoperation by a user to insert the second optical disk 2. Accordingly, it is possible to prevent not only damage to the optical disk 2 by misinsertion but also breakage of devices, equipment and the like such as the disk drive device 6.

Accordingly, an information signal may be recorded (written) on and/or reproduced (read) from the optical disk 2. Thereafter, when ejection of the optical disk 2 is selected by termination of recording or reproduction, the optical disk 2 is transferred to the disk ejection part through an operation of the disk transfer mechanism 10 or the like reverse to the aforementioned operation during insertion. Then, when the optical disk 2 is transferred until a part of the optical disk 2 protrudes from the disk entrance 9, the optical disk 2 may be taken out by a user.

As described above, according to an embodiment of the present invention, a disk clamp structure with small components and a narrow occupied space may be provided, and the whole apparatus may be reduced in size. The number of components is small and components not having a high strength may be used, making it possible to reduce the cost. Further, since a clamp member is moved depending on an inclined surface of a protrusion, the clamp may be easily controlled in position and attitude. Moreover, an operation sound and a driving load may be reduced by controlling an operating speed/operating force of the clamp member at an operation (attachment) position. When chucking of the clamp member is released, the clamp member is operated against a load determined by a magnet force, and the load is drastically reduced at the moment of release, so that the stripped clamp member and its surrounding support structure are bounded to generate a large operation sound. However, according to an embodiment of the present invention, an operation sound and a load may be effectively reduced by performing the release operation and making an attitude of the clamp member oblique during the release.

It should be understood by those skilled in the art that various modifications, combinations, sub-combinations and alterations may occur depending on design requirements and other factors insofar as they are within the scope of the appended claims or the equivalents thereof.

What is claimed is:

1. A disk recording and/or reproducing apparatus comprising:
    a disk mounting part on which a disk-shaped recording medium is detachably mounted;
    a clamp member holding the disk-shaped recording medium mounted on the disk mounting part between the clamp member and the disk mounting part; and
    a support member movably supporting the clamp member,
    wherein one of the disk mounting part and the clamp member has a magnet and the other has an attractable member attracted to the magnet,
    the apparatus further comprising:
    a rotating member rotatably supported by the support member; and
    a rotary elevating mechanism moving the rotating member up and down at a predetermined height by rotating the rotating member,
    wherein the rotating member is rotated and moved up and down by the rotary elevating mechanism, so that the clamp member is allowed to approach the disk mounting part by attracting the attractable member by a magnetic force of the magnet or to depart from the disk mounting part against a magnetic force of the magnet.

2. The disk recording and/or reproducing apparatus according to claim 1,
    wherein the rotary elevating mechanism includes:
    two or more cam projections provided in one of a part of the support member and a part of the rotating member brought into contact with each other and formed protruding toward the other; and
    two or more cam holes or cam recesses provided in the other of the parts of the support member and the rotating member brought into contact with each other and allowing entrance and exit of the two or more cam projections, and
    wherein the clamp member is maintained in an approximately horizontal state and moved up and down by the two or more cam projections entering and exiting the two or more cam holes or cam recesses.

3. The disk recording and/or reproducing apparatus according to claim 2,
    wherein the rotary elevating mechanism includes:
    a gear provided in the rotating member; and
    a drive lever having a gear meshed with the gear of the rotating member and being rotatably supported by the support member, and
    wherein the rotating member is rotated by rotating the drive lever.

4. The disk recording and/or reproducing apparatus according to claim 3, further comprising:
    a disk transfer mechanism transferring the disk-shaped recording medium between a disk ejection part from which the disk-shaped recording medium may be taken out and the disk mounting part,
    wherein the drive lever is rotated by moving the disk-shaped recording medium transferred by the disk transfer mechanism.

5. The disk recording and/or reproducing apparatus according to claim 2,
    wherein the clamp member has a round swelled part having at its top a pressed surface pressed against the disk-shaped recording medium, and an outer flange extending radially outward on a side opposite to the pressed surface of the round swelled part, the rotating member is formed by a ring-shaped member having on its inner periphery an inner flange supporting the outer flange of the clamp member, and has the two or more cam holes or cam recesses or the two or more cam projections radially outward of the inner flange, and the support member has a through-hole into which the round swelled part may be inserted, and has the two or more cam projections or the two or more cam holes or cam recesses radially outward of a periphery of the through-hole.

* * * * *